(12) United States Patent
Back et al.

(10) Patent No.: US 11,082,348 B2
(45) Date of Patent: Aug. 3, 2021

(54) NETWORK DEVICE AND QUEUE MANAGEMENT METHOD FOR NETWORK DEVICE

(71) Applicant: LG ELECTRONICS INC., Seoul (KR)

(72) Inventors: Seoyoung Back, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 176 days.

(21) Appl. No.: 16/471,546

(22) PCT Filed: Dec. 19, 2016

(86) PCT No.: PCT/KR2016/014895
§ 371 (c)(1),
(2) Date: Jun. 19, 2019

(87) PCT Pub. No.: WO2018/117280
PCT Pub. Date: Jun. 28, 2018

(65) Prior Publication Data
US 2021/0135996 A1 May 6, 2021

(51) Int. Cl.
*H04L 12/851* (2013.01)
*H04L 12/865* (2013.01)
(Continued)

(52) U.S. Cl.
CPC .......... *H04L 47/2408* (2013.01); *H04L 47/32* (2013.01); *H04L 47/54* (2013.01); *H04L 47/6275* (2013.01)

(58) Field of Classification Search
None
See application file for complete search history.

(56) References Cited

U.S. PATENT DOCUMENTS 6,771,653 B1 * 8/2004 Le Pennec .............. H04L 41/32
370/412
2007/0297329 A1 * 12/2007 Park ...................... H04W 12/08
370/230.1
(Continued)

FOREIGN PATENT DOCUMENTS

JP 2006076175 3/2006
KR 20040080367 9/2004
(Continued)

OTHER PUBLICATIONS

PCT International Application No. PCT/KR2016/014895, International Search Report dated Sep. 13, 2017, 3 pages.
(Continued)

*Primary Examiner* — Eunsook Choi
(74) *Attorney, Agent, or Firm* — Lee Hong Degerman Kang Waimey

(57) ABSTRACT

A method for selecting a transmission of a network device is disclosed. In particular, a method for selecting a transmission of a network device comprising a plurality of queues for storing data frames is disclosed. Here, each of the plurality of queues corresponds to a different traffic class, the method comprising: a step of obtaining information about a transmission selection algorithm for the plurality of queues; and a step of selecting data frames for transmission from a corresponding queue on the basis of transmission selection algorithm information. Here, the transmission selection algorithm may correspond to a strict priority algorithm, a credit-based shaper algorithm, or a burst transmission algorithm.

4 Claims, 22 Drawing Sheets

(51) Int. Cl.
*H04L 12/863* (2013.01)
*H04L 12/823* (2013.01)

(56) References Cited

U.S. PATENT DOCUMENTS

| | | | |
|---|---|---|---|
| 2013/0315244 A1* | 11/2013 | Rabie | H04L 45/04 370/392 |
| 2016/0044542 A1* | 2/2016 | Kovacs | H04L 47/2441 370/328 |
| 2018/0212469 A1 | 7/2018 | Liu et al. | |

FOREIGN PATENT DOCUMENTS

| | | |
|---|---|---|
| KR | 101138105 | 4/2012 |
| KR | 101468082 | 12/2014 |
| KR | 20150066335 | 6/2015 |

OTHER PUBLICATIONS

European patent application No. 16924301.1, European search report dated Jun. 22, 2020, 8 pages.

\* cited by examiner

Fig. 4

|  | | Number of available traffic classes | | | | | | | |
|---|---|---|---|---|---|---|---|---|---|
| | | 1 | 2 | 3 | 4 | 5 | 6 | 7 | 8 |
| Priority | 0 | 0 | 0 | 0 | 0 | 0 | 1 | 1 | 1 |
| | 1 | 0 | 0 | 0 | 0 | 0 | 0 | 0 | 0 |
| | 2 | 0 | 0 | 0 | 1 | 1 | 2 | 2 | 2 |
| | 3 | 0 | 0 | 0 | 1 | 1 | 2 | 3 | 3 |
| | 4 | 0 | 1 | 1 | 2 | 2 | 3 | 4 | 4 |
| | 5 | 0 | 1 | 1 | 2 | 2 | 3 | 4 | 5 |
| | 6 | 0 | 1 | 2 | 3 | 3 | 4 | 5 | 6 |
| | 7 | 0 | 1 | 2 | 3 | 4 | 5 | 6 | 7 |

Fig. 9

| SRP | | |
|---|---|---|
| MSRP | MVRP | MMRP |
| MRP | | |

Fig. 14

| Index | Stream ID |
|---|---|
| 1 | 3 |
| 2 | 6 |
| 3 | 7 |

Fig. 16

```
M_UNITDATA.request (
  destination_address,
  source_address,
  mac_service_data_unit,
  priority,
  drop_eligible,
  frame_check_sequence,
  service_access_point_identifier,
  connection_identifier
)
```

(a)

```
M_UNITDATA.indication (
  destination_address,
  source_address,
  mac_service_data_unit,
  priority,
  drop_eligible,
  frame_check_sequence,
  service_access_point_identifier,
  connection_identifier
)
```

(b)

NETWORK DEVICE AND QUEUE MANAGEMENT METHOD FOR NETWORK DEVICE

CROSS-REFERENCE TO RELATED APPLICATIONS

This application is the National Stage filing under 35 U.S.C. 371 of International Application No. PCT/KR2016/014895, filed on Dec. 19, 2016, the contents of which are all hereby incorporated by reference herein in their entirety.

TECHNICAL FIELD

The present invention relates to a network device and a transmission selection method of the network device; and, more particularly, to a queue management method for efficient management of memory in the network device.

BACKGROUND ART

Networks such as Local Area Network (LAN) are used in various fields. Such a network may be used as an industrial network or an in-vehicle network due to advances of in-vehicle communication technology to facilitate development of recent smart cars.

DISCLOSURE

Technical Problem

Queue management in a network needs to be handled efficiently according to a target application or intended use of the data. Also, queue management in a network has to be determined by taking into account priority or importance of an input stream.

Technical Solution

To solve the technical problem above, the present invention proposes a network device and a transmission selection method of the network device.

A network device according to one embodiment of the present invention comprises a queue storing a plurality of data frames and a processor connected to the queue, wherein the plurality of data frames have the same traffic class. As an embodiment, the processor may be configured to determine whether the queue satisfies a preconfigured frame removal condition and to remove at least one data frame from the queue if the preconfigured frame removal condition is satisfied.

As an embodiment, the processor may be configured to identify streams to which the plurality of data frames belong respectively if at least one data frame is to be removed from the queue and to remove data frames of at least one stream among the identified streams based on preconfigured stream priority information.

As an embodiment, the stream priority information may include stream identification information about a predefined critical stream and priority information associated with each stream identification information, wherein the critical stream is a stream included in the stream priority information for minimizing frame loss.

As an embodiment, the processor may be configured to remove with top priority data streams of a non-critical stream rather than the critical stream among the identified streams if the at least one data frame is to be removed based on the preconfigured stream priority information.

As an embodiment, the processor may be configured to remove a first data frame of a first critical stream having the lowest priority within the critical streams among the identified streams if the at least one data frame is to be removed based on the preconfigured stream priority information after the data frame of the non-critical stream is removed.

As an embodiment, the processor may be configured to identify a stream to which a data frame belongs by using information obtained from the data frame or additional information in addition to the information obtained from the data frame.

A queue management of a network device according to one embodiment of the present invention may comprise storing a plurality of data frames to a queue, wherein the plurality of data frames have the same traffic class; determining whether the queue satisfies a preconfigured frame removal condition, and removing at least one data frame from the queue if the preconfigured frame removal condition is satisfied.

As an embodiment, the removing at least one data frame from the queue comprises identifying streams to which the plurality of data frames belong respectively; and removing data frames of at least one stream among the identified streams based on preconfigured stream priority information.

As an embodiment, the stream priority information may include stream identification information about a predefined critical stream and priority information associated with each stream identification information, wherein the critical stream is a stream included in the stream priority information for minimizing frame loss.

As an embodiment, the removing the at least one data frame based on the preconfigured stream priority information removes with top priority data streams of a non-critical stream rather than the critical stream among the identified streams.

As an embodiment, the queue management method may further comprise removing a first data frame of a first critical stream having the lowest priority within the critical streams among the identified streams if the at least one data frame is to be removed based on the preconfigured stream priority information after the data frame of the non-critical stream is removed.

As an embodiment, the identifying a stream to which each of the plurality of data frames belongs identifies a stream to which the data frame belongs by using information obtained from the data frame or additional information in addition to the information obtained from the data frame.

Advantageous Effects

The present invention performs a queue management method according to a target application or intended use of a network, thereby improving efficiency of data processing.

The present invention uses a queue management method, which takes into account priority or importance of an input stream, thereby maintaining performance of a network expected by a network device.

In what follows, additional effects of the present invention will be described together with composition of the invention.

DESCRIPTION OF DRAWINGS

FIG. 4 illustrates a mapping relationship between priorities and traffic classes according to one embodiment of the present invention.

FIG. 9 illustrates architecture for stream registration and reservation of FIG. 8.

FIG. 14 illustrates a stream priority table according to one embodiment of the present invention.

FIGS. 16(a) and 16(b) illustrate location of stream ID information according to one embodiment of the present invention.

MODE FOR INVENTION

In what follows, preferred embodiments of the present invention are described in detail with reference to appended drawings. Detailed descriptions with reference to appended drawings are not applicable only to the embodiments, which may be implemented according to the present invention but rather intended to describe preferred embodiments of the present invention. The following descriptions given below include specific details for a thorough understanding of the present invention. However, it is apparent for those skilled in the art that the present invention may be implemented without involving the specific details.

Most of terms used in the present invention have been chosen among the terms widely accepted in the corresponding field. However, some of the terms are selected arbitrarily by the applicant and their meaning will be described in detail in the following descriptions if needed. Therefore, the present invention should be understood not by the apparent names or immediate meanings of the terms but by the intended meanings of the terms.

The present invention relates to a network device, which may perform the whole or part of functions of a station (or system) constituting a network such as the Institute of Electrical and Electronics Engineers (IEEE) 802 network. For example, a network device may correspond to a bridge implemented according to the IEEE802.1D or IEEE802.1Q or a device belonging to the bridge or including the bridge. In one embodiment, a network device may perform a connectivity function for devices (or networks).

Figure 1:
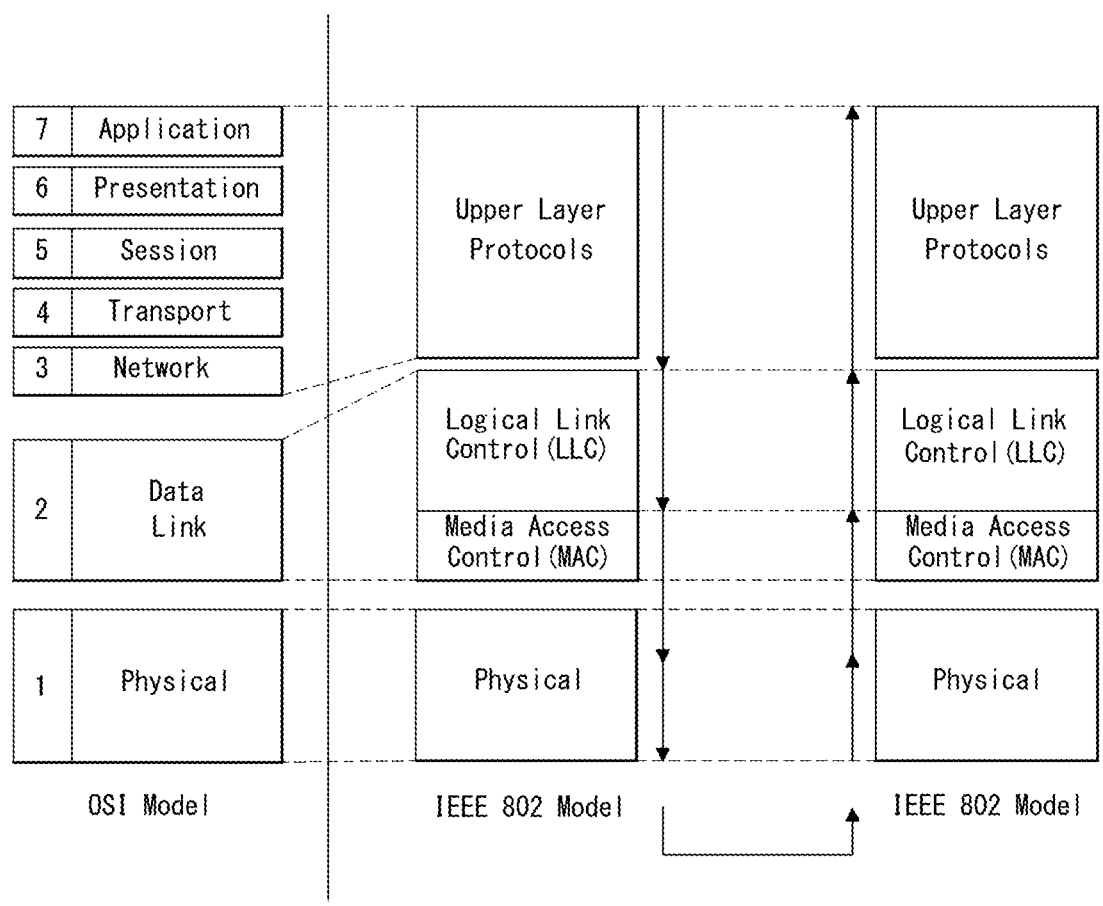
FIG. 1 illustrates a network model according to one embodiment of the present invention.

FIG. 1 illustrates a network model according to one embodiment of the present invention. More specifically, FIG. 1 compares a network model according to one embodiment with the Open System Interconnection (OSI) 7 layer. For example, the network model of FIG. 1 illustrates reference architecture of a station (for example, a bridge or end station) within a network based on the IEEE802.

The OSI 7 layer model shown in the left of FIG. 1 is a basic model (or reference model) of a standard network structure developed by the International Standard Organization (ISO), which defines a process ranging from connection for network communication to completion thereof into seven layers. This model works as a reference guideline for various network communication protocols but does not correspond to an industry standard that actually has to be obeyed. Functions of individual layers of the OSI 7 layer model may be described briefly in an order from a lower layer to an upper layer as follows.

First, the physical layer is a physical medium used when network data are transmitted, which establishes and terminates a connection; provides shared communication resources, and converts an analog signal to a digital signal or vice versa. The physical layer may also be called layer 1.

The data link layer performs the function of data transmission between physical networks. One of primary purposes of the data link layer is to provide an address designation system used for identifying physical devices and to provide an error checking mechanism to ensure that data has not been modulated. The data link layer may be called layer 2.

The network layer performs a routing function between physical networks, and routers operate in this layer. Also, the network layer may perform functions such as managing logical addresses (for example, IP addresses) of network hosts, identifying a protocol by segmenting packets, and detecting an error. The network layer may be called layer 3.

The transport layer provides a connection-oriented protocol and a non-connection oriented protocol, and firewalls and proxy servers operate in this layer. One of primary purposes of the transport layer is to ensure reliable data transmission to lower layers. In other words, the transport layer is designed mainly to guarantee node-to-node error-free transmission. The transport layer may be called layer 4.

The session layer performs a function of managing sessions or dialogues between two computers. The session layer provides a function for connecting, managing, and terminating all of communication equipment, function for preventing instantaneous loss of a connection and terminating a connection between hosts properly, function for determining whether a connection is unilateral or bilateral, and so on. The session layer may be called layer 5.

The presentation layer performs a function of encoding and decoding data transmitted or received to and from the upper application layer. In addition, the presentation layer may include a few encryption and decryption formats for safe use of data. The presentation layer may be called layer 6.

The application layer provides a function for accessing network resources by the user. The application layer provides all of basic interfaces for network activities, which typically corresponds to a unique layer exposed to the user. The application layer may be called layer 7.

In this way, if a network structure is partitioned into separate layers, since protocols operating in the respective layers are independent of each other, an advantage is obtained that protocols may be designed and analyzed easily. Meanwhile, a network system, even if it follows the OSI 7 layer model, does not necessarily have to include all the layers described above for proper operation of the system, and part of the layers may be omitted or modified.

The central and right part of FIG. 1 shows a network model according to one embodiment of the present invention (hereinafter, "network model"). As an embodiment, the network model may be a model of a standard network defined by the Institute of Electrical and Electronics Engineers (IEEE). The IEEE802 network model is based on the OSI 7 layer model, which refers to a network model composed of one or more interconnected networks using the Media Access Control (MAC) protocol specific to the IEEE802 standard. The IEEE802 network model mainly emphasizes lower two layers of the OSI 7 layer model, namely physical and data link layers. In what follows, each layer of a network model will be described with respect to the case where the network is based on the IEEE802 network model.

As shown in the central and right part of FIG. 1, the network model may include a physical layer corresponding to the physical layer of the OSI 7 layer model, data link layer corresponding to the data link layer thereof, and layers corresponding to the layers of the OSI 7 layer model ranging from the network layer up to the highest, application layer. Here, the layers corresponding to the layers of the OSI 7 layer model ranging from the network layer up to the highest, application layer may be called collectively upper layers (or upper layer protocols). The layers may perform the same or similar functions of the corresponding layers, except for those specified particularly in the corresponding standards.

In one embodiment, the data link layer of the network model may be further divided into the Logical Link Control (LLC) sublayer and Media Access Control (MAC) sublayer. Depending on embodiments, the MAC sublayer may include part of the physical layer.

The LLC sublayer performs the function of connecting the MAC sublayer to an upper layer and performs the role of compensating for a difference between topologies of the MAC sublayer. In other words, the LLC sublayer may perform the role of enabling data transmission irrespective of the MAC topology of a communication network.

The MAC sublayer may perform the function of connecting the physical layer and the LLC sublayer above the physical layer; and may perform the function of enabling frameless data transmission between stations. In addition, the MAC sublayer prevents a plurality of stations from colliding with each other when a transmission medium with a limited capacity is employed, thereby providing communication with high reliability. The topology (or media access method) of the MAC sublayer may include a token bus, token ring, or CSMA/CD, for example. Other functions of the MAC sublayer may include a function for flow control between a connectivity device such as a bridge and an end station and a function for forwarding frames according to a destination address.

As shown in the central part of FIG. 1, when a receiver-side network model transmits data, data may be processed in the descending order as it goes down from the highest layer to the lowest layer, the physical layer, one after another. At this time, encapsulation is performed while data is relayed down to lower layers, where, in general, each layer adds a header and/or tail including specific information to the data received from the layer above and then relays the data to the layer below. The data relayed in this manner may be transmitted to a transmitter-side through physical layer processing.

As shown in the right part of FIG. 1, when the network model receives data, data may be processed in the ascending order as it goes up from the lowest layer, the physical layer, to the highest layer, one after another. At this time, decapsulation is performed while data is transmitted to upper layers, where, in general, each layer analyzes and processes a header and tail from the data received from the layer below and then relays the data the header and tail of which have been removed to upper layers. If each layer processes data in this manner, the final application layer may receive only the initially generated, original data. In what follows, the data handling processes between the separate layers will be described in detail with reference to FIG. 3.

The present specification describes various embodiments of the present invention with respect to the data link layer among the layers of the network model described above. For example, the present specification describes bridges within a bridged network, which perform the whole or part of the functions of the data link layer of the IEEE 802 network.

In the present specification, a bridged network denotes a concatenation of networks interconnected by bridges, and the bridge denotes a device (or station) which connects networks in the bridged network. For example, if the network follows the IEEE802 model, a bridged network may be a concatenation of individual IEEE 802 LANs interconnected by bridges, and the bridge may be an MAC bridge or Virtual LAN (VLAN) bridge following the IEEE802.1D or IEEE802.1Q. The MAC bridge or VLAN bridge will be described in detail with reference to FIG. 5.

Figure 2:
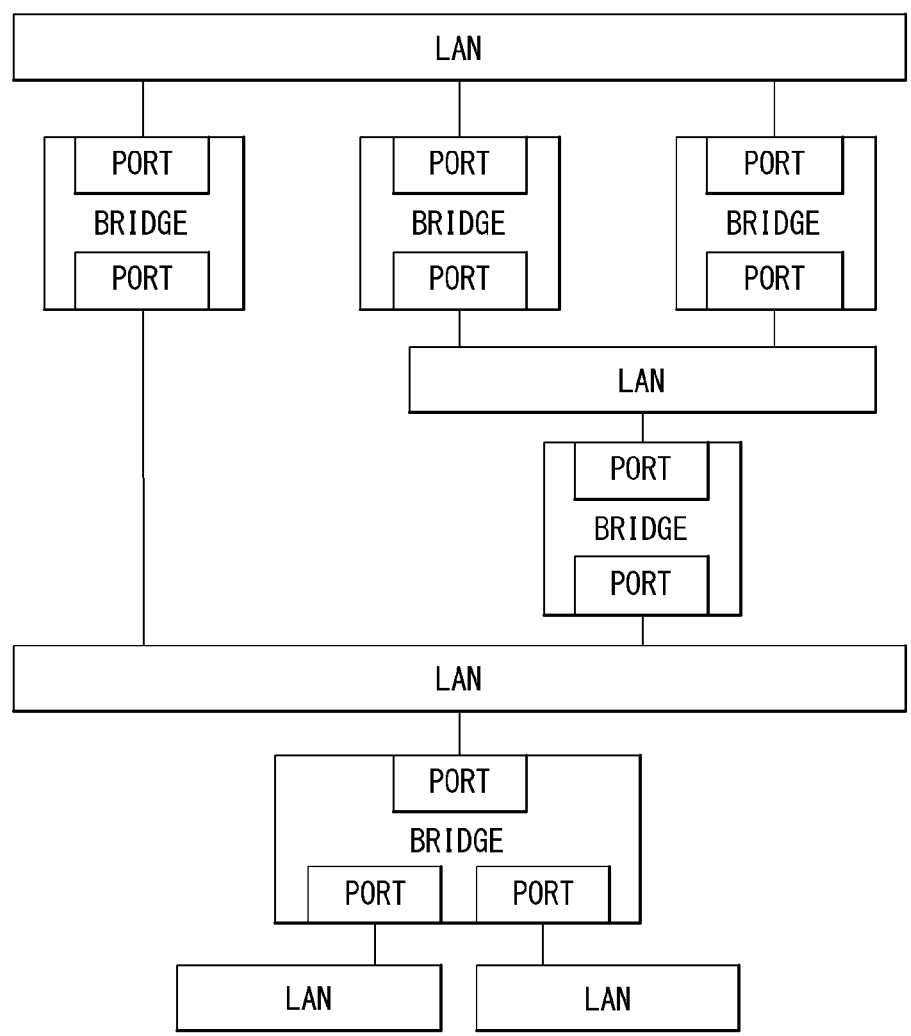
FIG. 2 illustrates a bridged network according to one embodiment of the present invention.

FIG. 2 illustrates a bridged network according to one embodiment of the present invention. More specifically, FIG. 2 illustrates a physical topology of a bridged network including bridges, which perform the whole or part of the functions of the data link layer of the network model of FIG. 1. In the embodiment of FIG. 2, a bridged network may be a network including MAC bridges or VLAN bridges following the IEEE802.1D or IEEE802.1Q.

As shown in FIG. 2, a bridged network may include LANs and bridges. A bridge may include two or more bridge ports. Each bridge port may attach a LAN to the bridge and provide bidirectional connectivity for MAC frames. In other words, each bridge may connect two LANs by transferring frames through a bridge port. Each LAN may be connected to all of the other LANs through a bridge or connected to bridges together with zero or more other LANs.

In one embodiment, a bridged network may be a virtual bridged network including VLAN bridges. Here, a virtual bridged network may be a bridged network, which concatenates individual IEEE LANs interconnected to each other by bridges including VLAN bridges compliant with the IEEE802.1Q. As an embodiment, a virtual bridged network may construct several VLANs by using VLAN identifiers (IDs) within a frame to be transmitted. In the present specification, a virtual bridge may also be called a VLAN bridge, and a virtual bridged network may be called a VLAN bridged network or VLAN network.

When a bridged network is a virtual bridged network, a single VLAN bridge may connect a plurality of individual VLANs (or LANs) to each other. However, in this case, too, data transfer through a VLAN bridge is possible only among the same VLANs, and to transmit data to a different VLAN, a router operating in an upper layer has to be used. In one embodiment, whether individual VLANs are the same to each other may be determined by VLAN identification information allocated to each VLAN. For example, a VLAN bridge may determine whether interconnected VLANs are identical to each other by using VLAN identification information such as VLAN ID information (or field) included in a VLAN tag of an input data frame and allow data exchange only among the same VLANs. The structure of the bridged network and individual bridges as described above and operating principles thereof will be described with reference to FIG. 5.

In what follows, embodiments of the present invention will be described mainly with reference to the case where bridges and bridged network are VLAN bridges and VLAN bridged network following the IEEE 802.1Q. However, the embodiments are merely an example introduced for the convenience of descriptions, and the same or similar descriptions may be applied to other bridges (for example, MAC bridges) and bridged networks following the IEEE 802.1 except for a specific case limited to the VLAN.

Figure 3:
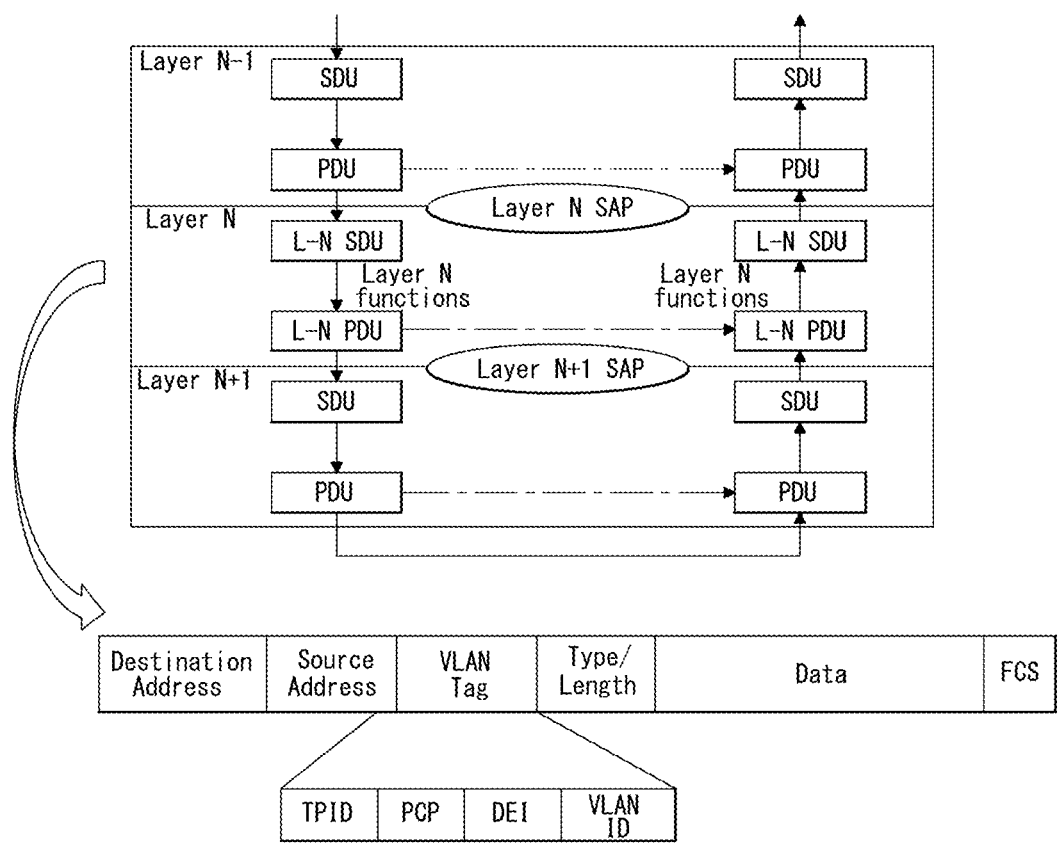
FIG. 3 illustrates a method for transmitting data between layers of the network model of FIG. 1.

FIG. 3 illustrates a method for transmitting data between layers of the network model of FIG. 1. In particular, FIG. 3 illustrates a method for the MAC sublayer (or MAC layer) of the network model of FIG. 1 to relay data received from an upper layer to a lower layer.

When data are exchanged between layers, necessary information may be added or information no longer needed may be removed, which is called an encapsulation/decapsulation process. For example, encapsulation is performed when data is relayed from an upper layer to a lower layer at a transmitter-side while decapsulation may be performed when data is relayed from a lower layer to an upper layer at a receiver-side.

As shown in the upper part of FIG. 3, at the transmitter-side, each layer may generate a Protocol Data Unit (PDU), which is a kind of datatype that may be relayed to a lower layer, by performing the encapsulation process of adding necessary information for Service Data Units (SDUs) based on the protocol of the corresponding layer. Here, an SDU refers to the information relayed between layers or sublayers. Contrary to the description above, at the receiver-side, each layer may generate an SDU, which is a kind of datatype that may be relayed to an upper layer, by performing the decapsulation process of obtaining necessary information from the PDUs based on the protocol of the corresponding layer.

As an embodiment, when layer N is the MAC sublayer of the network model of FIG. 1, the layer N may perform encapsulation in the layer N on the SDU (L-N SDU) received from the LLC sublayer (layer N−1), which is the upper layer, generate PDU (L-N PDU), and relay the generated PDU to the physical layer (layer N+1), which is the lower layer. The PDU (L-N PDU) generated at the layer N may have a frame format as shown in the lower part of FIG. 3. In other words, the PDU of the MAC sublayer of the network model (for example, Ethernet) of FIG. 1 may have a frame format which is the same as shown in the lower part of FIG. 3. In the present specification, the L-N PDU may also be called the PDU of the Ethernet MAC layer, MAC PDU, or MAC frame; and the frame format of the L-N PDU may also be called the Ethernet frame format or MAC frame format.

As shown in the lower part of FIG. 3, the MAC PDU may comprise a destination address field, source address field, type filed, length field, data field and/or Frame Check Sequence (FCS) field. In the present specification, except for the data field, each individual field may also be called a control field.

The destination address field includes destination address information of the MAC, and the source address field includes the source address information of the MAC. In the present specification, the destination address field may be called a destination field, and the source address field may be called a source field.

The type field includes type information of an upper layer protocol. For example, the type field may provide the type information of the protocol of the LLC sublayer (or layer). The length field includes information about the length of the data field. As an embodiment, the length field may express the length of data within the data field in terms of octets. In one embodiment, the type field and length field may be merged into one single field (for example, type/length field).

The data field includes data received from an upper layer. The data field may include the SDU received from the upper layer. The FCS field, which is a field containing information for error detection, may be inserted into the end part of a frame for error detection at the receiver side.

As an embodiment, the MAC PDU may further include a VLAN tag field. For example, when a bridged network is a VLAN bridged network, which includes VLAN bridges, the MAC PDU may further include a VLAN tag field.

The VLAN tag field is an optional tag, which may exist depending on whether the VLAN is supported or not. As an embodiment, the VLAN tag field may include a Tag Protocol Identifier (TPID) field, Priority Code Point (PCP) field, Drop Eligible Indicator (DEI) field and/or VLAN ID (VLAN Identifier) field. As an embodiment, the VLAN tag field may be located before the type/length field or included within the type/length field, but the present invention is not limited to the specific embodiment.

The TPID field includes protocol ID information of a VLAN tagged frame. For example, when the corresponding frame is a VLAN tagged Ethernet frame (or MAC frame), the TPID may have a fixed value (for example, in the case of a customer network, 0x8100). Depending on the existence of the TPID field having a fixed value, whether the corresponding frame supports a VLAN tag may be determined. As an embodiment, the TPID field may be located at the very beginning of the VLAN tag field.

The PCP field may include information about the priority of the corresponding field, where the priority information may be associated with (or mapped to) the traffic class. As an embodiment, the PCP field may be composed of a 3-bit field, by which priorities of 8 frames may be expressed. As an embodiment, each bridge port of a bridge may include a plurality (for example, 8) of outbound queues. Here, an outbound queue refers to a queue (or buffer) used for outputting data and data frames from the corresponding bridge port. In this case, the value of a PCP field may be used for determining to which queue among a plurality of outbound queues the corresponding frame has to be stored, which will be described in detail with reference to FIG. 4.

The DEI field includes information indicating whether a frame may be removed when the corresponding frame satisfies a pre-configured condition. For example, the DEI field may include information indicating whether the current frame may be removed when the amount of data has increased to render the traffic in a congestion status.

The VLAN ID field shows the ID of a VLAN to which the corresponding frame belongs. By using the VLAN ID field, data transmission may be made to be performed only between devices having the same VLAN ID in a VLAN bridged network. In the present specification, the VLAN ID may be referred to as VID.

In one embodiment, the value of the destination address field and the value of the VLAN ID field may be used to determine a bridge port (for example, an output bridge port) of the bridge, and the value of the PCP field may be used to determine to which queue of the determined bridge port to store data frames. In addition, the PCP field and the DEI field may become the elements, which determine Quality of Service (QoS).

In the embodiment above, only the embodiment where the MAC PDU includes the VLAN tag field has been described; however, depending on embodiments, a tag field required according to the type (provider network, backbone network, or customer network) of a network to which the MAC PDU is transmitted may be included together with the VLAN tag field or may be included by replacing the VLAN tag field.

In the receiver side, layer N may receive a PDU (L-N PDU) including the aforementioned fields from the physical layer (layer N+1), which is the lower layer, perform decapsulation on the received PDU, obtain various pieces of information, generate an SDU (L-N SDU), and forward the generated SDU to the LLC sublayer (layer N−1), which is the upper layer. The layer N may perform various operations performed in the corresponding layer based on the obtained information.

FIG. 4 illustrates a mapping relationship between priorities and traffic classes according to one embodiment of the present invention. In the embodiment of FIG. 4, the horizontal axis represents the number of available traffic classes, and the vertical axis represents priorities. The mapping relationship between the priority and traffic class shown in the embodiment of FIG. 4 is one of illustrative mapping relationships, which may be modified arbitrarily by the user of the network.

In the present specification, a traffic class refers to classification used to expedite transmission of frames. Also, an outbound queue refers to the queue (or buffer) used for outputting data and data frames from an output port of a bridge. Also, a frame (or data frame) refers to the unit of data transmitted. In the present specification, a queue may also be referred to as a buffer.

As described above, the value of the PCP field represents the priority of the corresponding frame, which may be associated with (or mapped to) the traffic class values corresponding to the respective queues of an output port of the bridge. Therefore, the value of the PCP field may be used to determine to which queue to store the corresponding frame among the queues of the output port. For example, a bridge may obtain priority information from the PCP field within a received frame, check the traffic class mapped to the corresponding priority by referring to the priority-class mapping table, and store the corresponding frame in a queue associated with the corresponding traffic class.

The data frame fed to an input port of the bridge, if its destination is known accurately, may be forwarded directly to a desired output port, otherwise the data frame may be forwarded to all of the other ports except for the input port. It has to be determined to which queue to store the frame forwarded to the output port among queues within the output port; at this time, a value of a traffic class associated with the value of the PCP field may be used. To this purpose, for example, a priority-class mapping table as shown in Table 4 has to be configured in advance.

As described above, since the PCP field is composed of a 3-bit field, each frame input to a bridge may have one of eight priorities. In addition, each bridge port may have one up to eight queues (or outbound queues), and each outbound queue may be mapped one-to-one to an allocated traffic class. In this case, the value of the traffic class may range from zero to N−1. Here, N represents the number of outbound queues of the corresponding port. For example, when the number of available queues of a bridge port is three, the value of an available traffic class at the corresponding bridge port may be 0, 1, 2. In other words, only three types of traffic classes may be used. At this time, it may be determined so that a queue corresponding to a lower traffic class has a lower priority. For example, a queue that corresponds to the traffic class 0 may have the lowest priority. However, depending on embodiments, the priority may be determined so that it has a lower value as the value of the traffic class becomes higher.

In the table of FIG. 4, the shaded part shows a mapping relationship between the traffic class and the priority when the number of available traffic classes is three. In other words, the table shows an illustrative mapping relationship between the PCP having eight code values (or priority values) and a traffic class having three class values. Referring to the corresponding part, since a frame whose priority (or PCP code value) ranges from 0 to 3 has a value of zero for the traffic class, one may see that the frame is stored in the first queue of the bridge port. In addition, since a frame whose priority (or PCP code value) ranges from 4 to 5 has a value of one for the traffic class, one may see that the frame is stored in the second queue of the bridge port. Also, since a frame whose priority (or PCP code value) ranges from 6 to 7 has a value of 2 for the traffic class, one may see that the frame is stored in the third queue. A description similar to the one given above may also be applied to a mapping relationship between the traffic class and the priority when the number of available traffic classes is different from 3.

As an embodiment, a frame stored in each queue may have a different traffic type. In other words, frames stored in a different queue may have a different traffic type. Here, the traffic type may include three types of traffic: for example, Best-Effort (BE) traffic, Rate Constrained (RC) traffic, and Time Trigger (TT) traffic.

BE traffic (or frame) is a traffic type having a low priority, for which timing or latency may not be guaranteed. In other words, when frames stored in a plurality of queues are output sequentially through one output port, BE traffic may be transferred with a delay without time guarantees or may not be transferred at all in the event of congestion.

RC traffic (or frame) may be guaranteed to have transmission bandwidth by using a minimum time interval between frames and the largest frame size. In the case of RC traffic, transmission time is guaranteed within the guaranteed bandwidth, and transmission is possible without loss of frames in the event of congestion. However, since the guaranteed overall transmission delay is large, RC traffic is suitable for transmission of audio and video data but not suitable for time-sensitive industrial control or automotive applications TT traffic (or frame) has a structure in which frames are transmitted directly without interference from other frames within a given time period, which is free from frame loss and is characterized by short transmission time. TT traffic may be suitable for control signals with a demanding requirement on time sensitivity. For example, TT traffic may be suitable for time-sensitive industrial control or automotive applications.

When the traffic types are associated with the traffic classes shown in the shaded part of Table 4 above, for example, the outbound queue storing frames of traffic class 0 may be used for transmitting BE traffic, the outbound queue storing frames of traffic class 1 may be used for transmitting RC traffic (for example, traffic of audio or video-related frames), and the outbound queue storing frames of traffic class 2 may be used for transmitting TT traffic (for example, traffic of frames related to automotive applications or control signals for factory automation).

Figure 5:
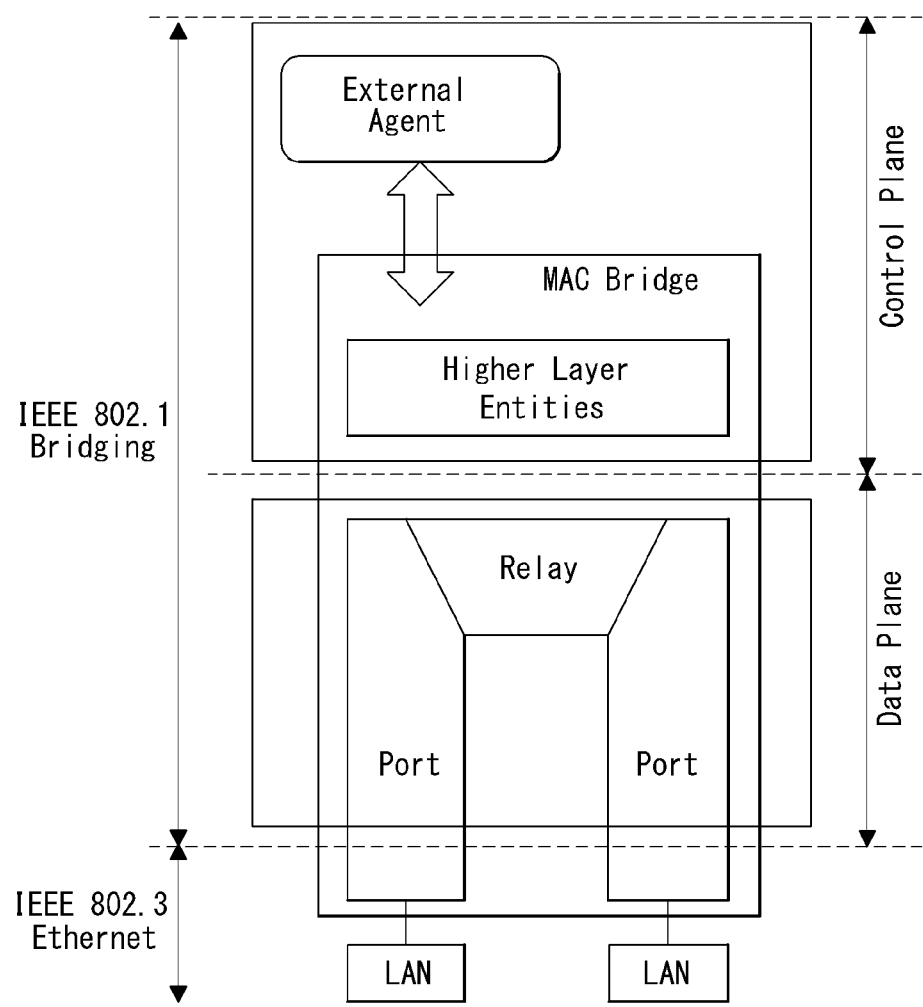
FIG. 5 illustrates bridge architecture according to one embodiment of the present invention.

FIG. 5 illustrates bridge architecture according to one embodiment of the present invention. More specifically, FIG. 5(a) illustrates bridge architecture according to one embodiment of the present invention, FIG. 5(b) illustrates a first example of the bridge architecture, and FIG. 5(c) illustrates a second example of the bridge architecture. As an embodiment, the bridge architecture of FIG. 5 may follow the IEEE802.1 specification. For example, the bridge architecture may be the architecture for the MAC bridge or VLAN bridge compliant with the IEEE802.1D or IEEE802.1Q standard.

Referring to FIG. 5(a), a bridge includes at least one bridge component. As an embodiment, a bridge may include at least two ports, MAC relay entity (or relay entity) and/or upper layer entities.

Of at least two bridge ports, the port through which incoming data is received from the LAN is called an ingress port, and the port through which outgoing data is transmitted to the LAN is called an egress port. As an embodiment, an ingress port may perform functions related to filtering or drop, (un)tagging, VID translation and/or (de)encapsulation. As an embodiment, an egress port may perform functions related to filtering, (un)tagging, VID translation, (de)encapsulation, metering, queuing, or transmission selection.

The relay entity refers to an entity, which interconnects bridge ports. As an embodiment, a relay entity may perform functions of relaying frames between bridge ports, filtering frames and/or learning filtering information.

Upper layer entities refer to the protocols, which determine a network through which data is communicated. Upper layer entities will be described in detail with reference to FIG. 6.

As an embodiment, the bridge component may be included in the control plane or data plane depending on its function. For example, upper layer entities may be included in the control plane while bridge ports and relay entities may be included in the data plane.

In one embodiment, an external agent may be further included in the control plane. Here, an external agent refers to the control provided from the outside instead of a protocol already provided by the upper layer entities. For example, an external agent may be a well-known Software Defined Network (SDN) controller. Through the external agent, a software-based controller may control and manage data transfer and operation of the network.

The bridge architecture of FIG. 5(b) may be the architecture of the MAC bridge. As an embodiment, the MAC bridge refers to a bridge which is implemented according to the IEEE802.1D or IEEE802.1Q standard and which does not recognize VLAN tagged frames. In other words, the MAC bridge refers to the bridge incapable of recognizing a VLAN tag included in the frame.

As an embodiment, the MAC bridge may include at least one MAC bridge component, which provides a function of supporting an Internal Sublayer Service (ISS) at each bridge port and a function of relaying frames between bridge ports. For example, as shown in FIG. 5(b), to perform the aforementioned functions, the MAC bridge may include at least two ports, relay entity and/or upper layer entities.

Here, an ISS is a service provided by an internal layer of the MAC sublayer, providing basic functions of the MAC service such as data transmission among a plurality of Service Access Points (SAPs) and relaying of data frames between bridge ports.

In general, when an upper layer calls a lower layer for data or vice versa, inter-layer communication may be performed by relaying primitives through the Service Access Point (SAP) or receiving the primitives. And in a layered structure including the MAC sublayer, each layer should be able to operate independently from a media access method. To this purpose, as described above, whichever media access method is used, the MAC sublayer should be able to process the method, and the ISS performs the role of determining primitives of the SAP. As an embodiment, the ISS may compose a primitive by using parsed data received from the physical layer and data used locally.

In one embodiment, the primitive of an ISS may include such parameters as destination_address, source_address, Mac_Service_Data_Unit (MSDU), priority, Drop_Eligible (DE), Frame_Check_Sequence (FCS), Service_Access-_Point_identifier (SAP identifier) and/or connection_identifier. Here, the destination address, source address, MSDU, priority, DE, and FCS parameters are the same as described with reference to FIG. 4. Also, the SAP identifier represents the ID of a bridge port used in a relay entity, and the connection identifier represents a connection in the MAC sublayer, for example, identification (or distinction) of a connection like a transmission connection for transmitting data (or data frames). The connection identifier is important for such a case when the number of SAPs is one, and for other cases, the connection identifier may be set to null.

As an embodiment, the destination address, source address, MSDU, priority, DE, and FCS parameters may be obtained by parsing a frame received from the physical layer, and the SAP identifier and connection identifier parameters may be used internally (or locally).

The bridge architecture of FIG. 5(c) may be the architecture of a VLAN bridge, for example. As an embodiment, the VLAN bridge refers to a bridge which is implemented according to the IEEE802.1D or IEEE802.1Q and which may recognize, insert, and remove VLAN tags. In other words, different from the MAC bridge, the VLAN bridge refers to a bridge, which recognizes VLAN tags included in a frame.

As an embodiment, the VLAN bridge may include VLAN bridge components, which provide a function of supporting an Enhanced Internal Sublayer Service (EISS) at each bridge port and a function of relaying frames between bridge ports. For example, as shown in FIG. 5(b), to perform the aforementioned functions, the VLAN bridge may include at least two ports, relay entity and/or upper layer entities.

The EISS is an enhanced internal layer service provided by the MAC sublayer; to provide more enhanced services than the ISS, for example, to provide services such as recognition, insertion, and removal of VLAN tags, the EISS may further include components and parameters required for operation of the VLAN bridge. As an embodiment, primitives of the EISS may further include parameters such as a VLAN identifier (vlan_identifier), flow hash (flow_hash) and/or time-to-alive (time_to_alive) in addition to the aforementioned primitives of the ISS.

Here, the VLAN identifier parameter represents the ID of a VLAN to be transferred, which may be known through the frame received from the physical layer. Also, the flow hash parameter refers to the parameter used to determine which port to use among various ports capable of forwarding when a forwarding process is performed. Also, the time-to-alive parameter is the parameter used to determine how long a frame will remain alive through network hops, and as an embodiment, null value may be given as a value of the corresponding parameter.

Figure 6:
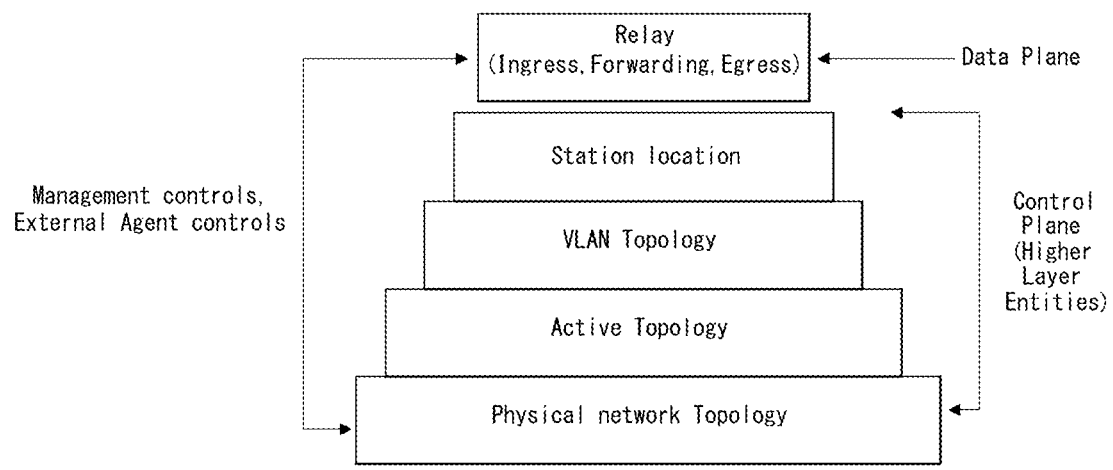
FIG. 6 illustrates upper layer entities of a control plane according to one embodiment of the present invention.

FIG. 6 illustrates upper layer entities of a control plane according to one embodiment of the present invention. More specifically, FIG. 6 illustrates upper layer entities of the control plane comprising the bridge architecture of FIG. 5. In what follows, with reference to FIG. 6, a layer hierarchy of upper layer entities of the control plane and the data plane will be described in detail.

Referring to FIG. 6, upper layer entities of the control plane includes physical network topology, active topology, VLAN topology and/or station location.

As shown in FIG. 2, physical network topology describes a physical connection configuration among LANs, bridges, and bridge ports. Here, a bridge port corresponds to the part, which connects the LAN and the bridge, through which bilateral transmission of Ethernet frames (or MAC frames) may be performed between the LAN and the bridge. This connection is implemented through a wired connection, and the physical network topology only represents a relationship among physical connections.

Active topology does not allow a loop to occur within a network, namely makes the network an active network in a loop-free status, which may be accomplished by activating or deactivating (or blocking) the status of a specific bridge port. If a loop is created within a bridged network, the same data is repeatedly copied within the bridge, thereby degrading the functionality of the bridge and making the MAC address table within the bridge unreliable. Also, if a loop is created when data is transmitted by using a broadcast function, data is broadcast continuously within the network; therefore, a phenomenon called a broadcast storm may paralyze the network. Therefore, in a bridged network, an interconnection relationship among stations connected to bridges has to be activated through active topology in order not to cause a loop to be created, and various algorithms have to be prepared to this purpose.

When an active network in a loop-free status is formed through active topology, a VLAN topology may configure, by using the aforementioned VIDs, a protocol through which data may be transmitted among VLANs of the same VID. After the VLAN topology is configured, individual MAC addresses belonging to the respective VLANs may be stored through station location, and a route that enables communication between stations may be formed. In this way, if a route to each station is determined, desired data may be forwarded through the relay of a bridge.

The process for forming the aforementioned topology may employ separate protocols for individual steps of the process performed one after another; however, depending on embodiments, one single protocol may exist, which constructs the active topology up to station location at the same time.

While the steps described above are related to forming a bridged network, the relay of a bridge represents operation of the bridge itself due to the data plane. In the bridge relay, data received through an input port of the bridge is forwarded to the output port and transmitted through the output port, where the data goes through several steps within the bridge. Detailed descriptions of the data transmission will be described later.

Meanwhile, after the active topology is formed, transmission capability between a port of the bridge and a port of a neighboring bridge may be measured, and stream reservation may be made possible. The aforementioned operation will be described in detail with reference to FIGS. 8 and 9.

Figure 7:
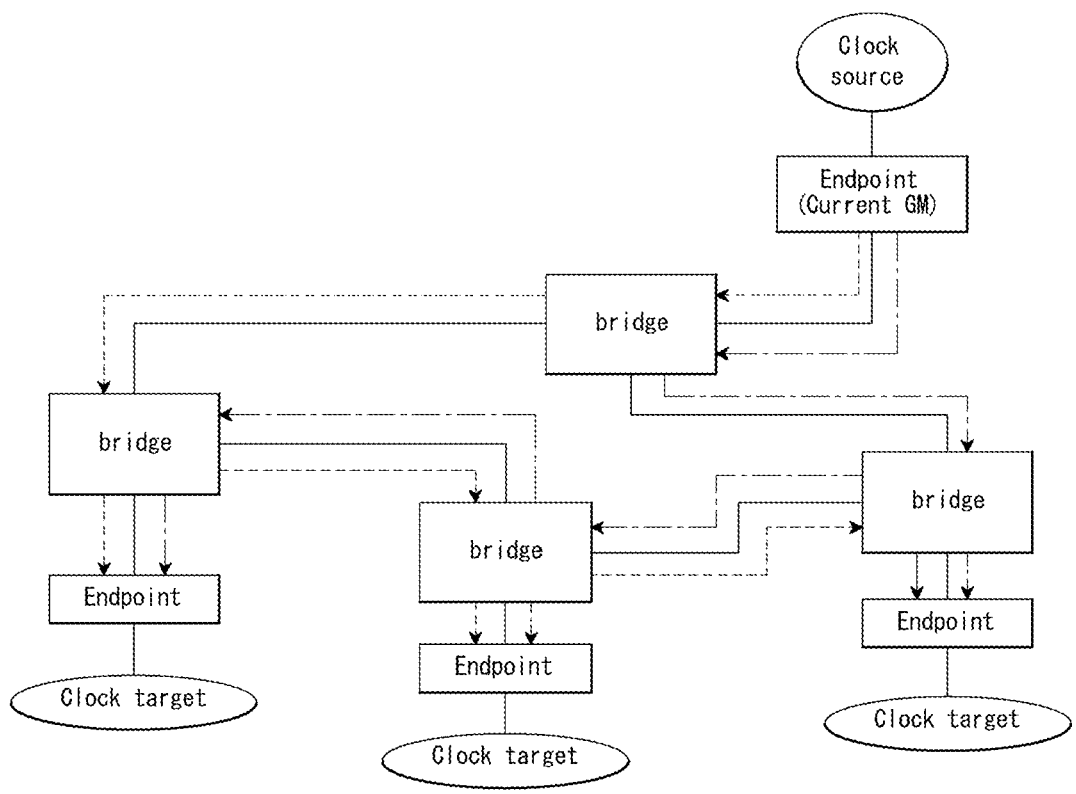
FIG. 7 illustrates a time synchronization method of a bridged network according to one embodiment of the present invention.

FIG. 7 illustrates a time synchronization method of a bridged network according to one embodiment of the present invention.

As described with reference to FIG. 6, when active topology is formed by using an arbitrary, single protocol or a plurality of protocols, a time synchronization operation may be performed among connected bridges. Time synchronization is performed to synchronize clocks of the bridges within the network and end points, which act as a final device, and enable transmission of time-sensitive frames. Through the time synchronization, it is possible to configure a time-sensitive network. As an embodiment, the IEEE 1588 protocol, which is known as a default protocol for time synchronization, may be used, but the present invention is not limited to the specific embodiment.

To describe a time synchronization process, bridges and end points (or stations) within the network may perform clock synchronization by exchanging messages periodically with a grandmaster (GM) clock. Through clock synchronization, except for the GM clock, all of the bridges and end points within the network may know their offset with respect to the GM clock, and time synchronization is possible based on the offset information. At this time, as an embodiment, among various clocks within the network, one with the best quality may be selected as the GM clock.

In one embodiment, the GM clock may be determined by using the Best Master Clock Algorithm (BMCA) that finds a clock exhibiting the best quality across the whole network. In other words, by using the BMCA algorithm, one of the clocks included in the individual stations (for example, bridges and end stations) within the whole bridged network may be determined as the GM clock. In another embodiment, the GM clock may be determined by the user's selection. In other words, without involving an algorithm such as BMCA, one clock may be determined as the GM clock based on the selection of the user.

In the embodiment of FIG. 7, the bridged network may perform time synchronization via two different routes to ensure clock redundancy. In this case, since time information is relayed through two different routes from one GM clock, even if one of the two routes is not activated for some reason, it is possible to perform time synchronization quickly through the other route.

In an additional or alternative embodiment, a method for setting an additional clock source may be used to ensure clock redundancy. In this case, if a first GM clock fails, a second clock source may be activated. By doing so, an advantage is obtained that when the first GM clock does not work, the pre-configured, second clock source in a waiting status may be selected as the GM clock, and time synchronization may be performed quickly without requiring time for searching for an alternative best GM clock again.

If the first embodiment shown in FIG. 7 is to ensure redundancy by employing redundancy routes, the second embodiment corresponds to have redundancy of clock sources. Both of the two embodiments may be a measure for ensuring fault tolerance.

Figure 8:
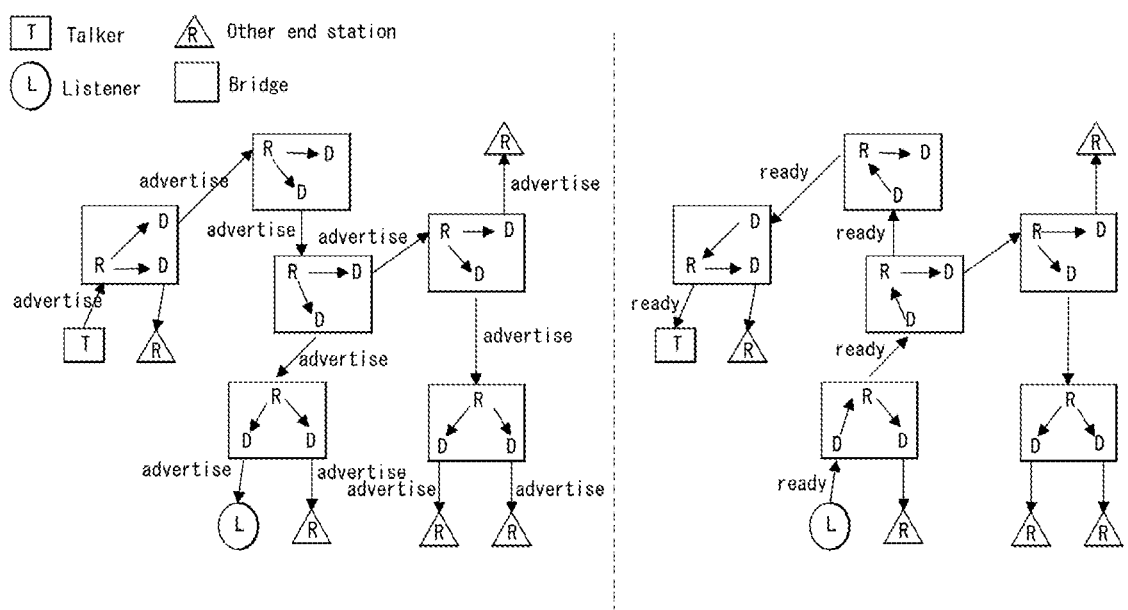
FIG. 8 illustrates a stream registration and stream reservation method according to one embodiment of the present invention.

FIG. 8 illustrates a stream registration and stream reservation method according to one embodiment of the present invention. In the present specification, a stream refers to unidirectional flow of data from a talker to one or more listeners. Here, a talker indicates a source of the stream or an end station, which is the producer of the stream while a listener indicates a destination of the stream or an end station, which is a receiver or a consumer of the stream.

As an embodiment, stream registration and reservation may be an operation belonging to the VLAN topology and station location among upper layer entities of the control plane described above. In the stream registration and reservation process, a route is established between a talker which attempts to send a stream through the bridged network and a listener which attempts to receive the stream, and whether frames may be transmitted via the route by using desired bandwidth and within a given time latency may be calculated. If a given condition is satisfied, frames may be transmitted via the route. By doing so, since frames may be transmitted within a desired time boundary without congestion loss, QoS may be ensured.

In the embodiment of FIG. 8, 'R' and 'D' represent the status of a bridge port, where denotes a registration status, and 'D' denotes a declaration status. If the status of a bridge port becomes the registration status, the bridge forwards received frames to other output ports except for itself, and the output ports, which have received the frames, enter the declaration status. While the process is performed, the MAC destination address and membership of the VLAN may be registered to the database of each port.

For registration of a stream, as shown in the left part of FIG. 8, a talker may first send a "talker advertise" message across the whole bridged network to which the talker belongs. As an embodiment, the talker advertise message may include information about a source MAC address, destination MAC address, stream ID, data rate and/or latency level. Here, the stream ID denotes an identifier for identifying a stream that a source (or talker) wants to transmit.

As an embodiment, each time the talk advertise message passes a bridge, the worst case latency may be calculated. If resources may not be secured while the talker advertise message is forwarded, the corresponding station may relay a "talker failed" message, which contains a code denoting a cause of the failure, to the listener.

If resources may be secured, and the listener has succeeded to receive the talker advertise message, the listener may send a "listener ready" message to the talker. In this case, as shown in the right part of FIG. 8, the listener ready message may be relayed in the reverse direction of the route along which the talker advertise message has been relayed from the talker to the listener. When the listener ready message is relayed, the talker may transmit a stream along the route, which guarantees QoS. After transmission of the stream is completed, a de-registration procedure is performed, and reserved bandwidth and route may be released.

If accumulated maximum latency, namely worst-case latency, included in a message transmitted to the station does not satisfy the QoS expected by the listener, the corresponding station may relay a "listener asking fail" message to the talker. Here, the station may be a concept including a bridge or end station.

Figure 9:
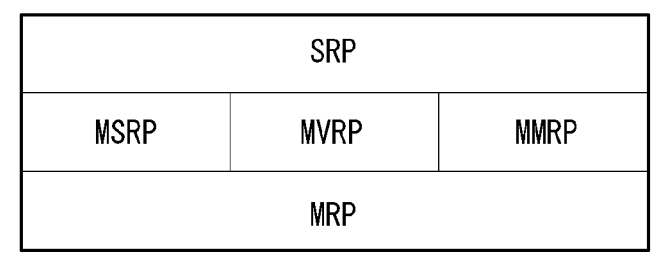

FIG. 9 illustrates architecture for stream registration and reservation of FIG. 8. More specifically, FIG. 9 illustrates a protocol (stream registration and reservation protocol) used for stream registration and reservation by the control plane of the bridge architecture of FIG. 5.

In the present specification, the stream registration and reservation procedure may be performed to the needs of the user, and when the procedure is used, up to 75% of the bandwidth may be allocated for the talker and the listener. In the allocated route, since frames of the corresponding talker have priority, the frames may receive less influence from other frames. Therefore, the stream registration and reservation method may be used for such applications requiring guaranteed QoS and smaller latency. For example, if the stream registration and reservation method is used for synchronizing video and audio data with each other, it is possible to synchronize them with each other while QoS is guaranteed at the same time.

Referring to FIG. 9, the stream registration and reservation protocol includes Multiple Registration Protocol (MRP), Multiple Stream Registration Protocol (MSRP), Multiple VLAN Registration Protocol (MVRP), Multiple MAC Registration Protocol (MMRP), and Stream Registration Protocol (SRP). MSRP protocol, MVRP protocol, and MMRP protocol correspond to applications of the MRP protocol.

SRP protocol operates based on the MSRP, MVRP, and MMRP protocols. As an embodiment, a station within a bridged network may perform the stream registration and reservation procedure by using the whole or part of the functions of the protocol of FIG. 9.

Multiple Registration Protocol (MRP) protocol refers to the protocol used for declaring attributes of a port. The MRP protocol is used by a bridge or end station to store stream ID, VLAN ID, MAC address, and so on to each port by using the MSRP, MVRP, and MMRP protocols corresponding to the applications of the MRP protocol, and thereby a network may be constructed efficiently.

MVRP protocol is used to register several VLAN IDs or VLAN memberships to a bridge port, and MMRP protocol is used to register several MAC addresses to the bridge port. By using the MVRP and MMRP protocols, multicast may be performed within a bridge. MSRP protocol allows all of the processes including transmission of a talker advertise message for registration of a stream by the talker as described with reference to FIG. 8, transmission of a talker failed message when a station fails to secure resources, and transmission of a listener ready message when resources are secured.

As an embodiment, MRP protocol uses a flooding method, and when the MRP protocol is used, a Multiple Registration Protocol Data Unit (MRPDU) message is generated and transmitted periodically to other bridge or end station. Here, the flooding method refers to a method by which data received by each station is relayed to all of the output ports except for input ports. MRPDU is a message corresponding to the second layer (layer 2) described above, namely a message corresponding to the data area of the MAC PDU used in the data link layer; when MRPDU is actually transmitted within a bridge, a source address, destination address, VLAN tag, and so on may be attached to the MDRPDU.

For example, when the network is started for the first time, and data is transmitted to a particular bridge, no prior information is given about to which port data has to be transmitted in order to arrive at a destination. In this case, if MRPDU is received, the bridge stores the source address of the MRPDU to the input port and transmits the MRPDU to all other available output ports except for the input port.

If an address value is stored in the input port as described above, when an end station having the corresponding address as a destination address transmits data afterwards, data may be transmitted by referring to the address value stored in the port of the bridge without having to perform flooding. In other words, if a routing table describing which address value is connected to (or associated with) which port within a bridge is defined, data may be transmitted efficiently. MMRP protocol is a protocol, which enables each port of a bridge to store an address value associated with the corresponding port as described above. In the same way, MVRP protocol enables each port of a bridge to store a VLAN ID associated with the corresponding port while MSRP protocol enables each port of a bridge to store a stream ID associated with the corresponding port.

MSRP protocol is a signaling protocol and transmits data called MSRPDU to perform the protocol. MSRP protocol enables a network resource to be reserved among end points and allows transmission and reception with desired QoS between a talker and a listener.

The address value, VLAN ID, and stream ID that pass through one port and are forwarded to the next bridge or end station may well have a plurality of values, and if filtering is performed on the data within a network based on the values, the network may be utilized efficiently. It is also possible to reserve a resource among end stations and to perform transmission, which satisfies desired latency (QoS) in a reserved interval. MMRP, MVRP, and MSRP protocols are all capable of supporting the operation above.

SRP protocol operates based on the MMRP, MVRP, and MSRP protocol; and defines a field called an SR class in the MSRPDU to enable transmitted streams to be identified. In other words, SRP protocol may specify features of a stream supposed to pass a reserved route by defining fields such as SRclassID, SRclassPriority, and SRclassVID within the MSRPDU. At this time, SRclassID field is intended for identifying the corresponding stream among various streams transmitted from a talker, SRclassPriority field is intended for allocating priority to the SR traffic class, and SRclassVID field is intended for identifying a VLAN for the SR traffic class.

Figure 10:
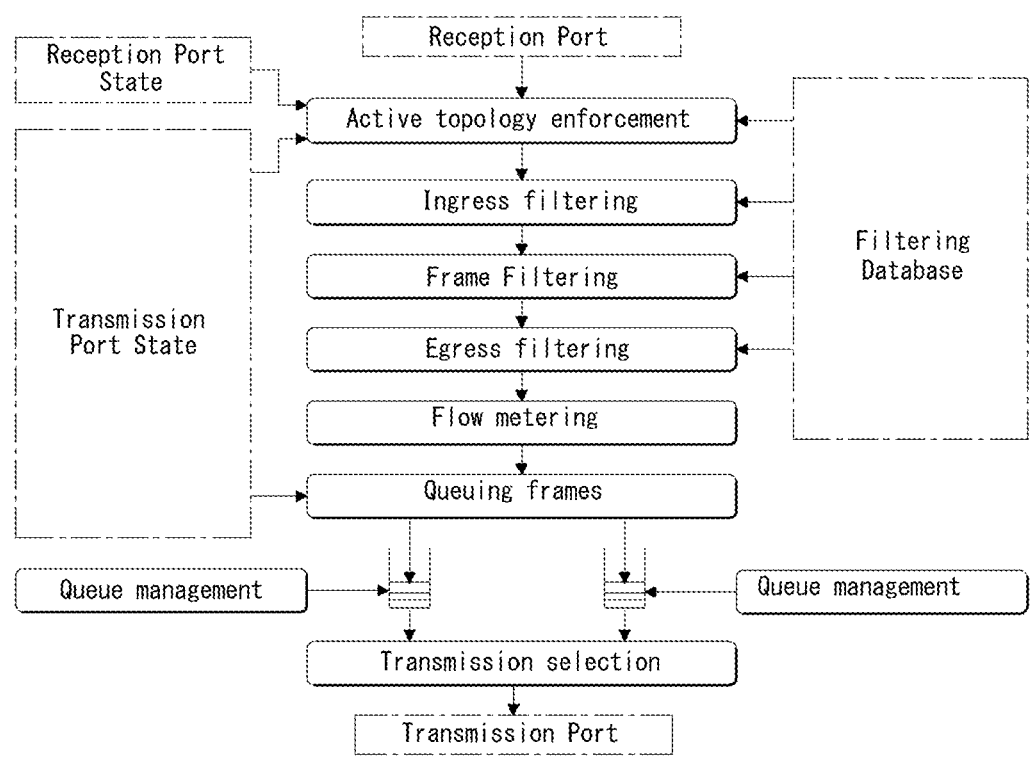
FIG. 10 illustrates a bridge forwarding process according to one embodiment of the present invention.

FIG. 10 illustrates a bridge forwarding process according to one embodiment of the present invention. More specifically, FIG. 10 illustrates a forwarding process of a bridge performed by the data plane of the bridge architecture of FIG. 5. In the present specification, the bridge forwarding process refers to a process required to relay data frames received by a reception bridge port (reception port) to an output bridge port (output port).

Referring to FIG. 10, first, when the reception port receives a data frame, active topology enforcement is performed. At this time, a bridge may have various port status through the active topology process of the control plane. As an embodiment, the port status may include a discarding status, learning status and/or forwarding status.

The discarding status refers to the status where a bridge port is disabled or blocked, in which the bridge does not forward input data. The learning status refers to the status where the bridge learns whether it is suitable to relay input data, in which the bridge may receive a data frame from a current port based on a stored source address (or destination address) and determine whether it is suitable to relay the received data frame. From the learning, the bridge may prevent an unwanted data loop from being created and prevent an unwanted MAC source address from being forwarded. The forwarding status refers to the status where data is actually relayed after the learning status is terminated.

After performing this step, a series of filtering steps (for example, ingress filtering, frame filtering and/or egress filtering) may be performed. The filtering step helps a received data frame be transmitted through a correct bridge output port by referring to the destination address and VID value stored in a filtering database. If an output port through which to transmit the data frame is determined, which frame is to be discarded in the occurrence of congestion may be determined in the flow metering step by using priority and a Drop Eligible Indicator (DEI) value.

A frame that has passed the flow metering step may be queued in the outbound queue based on the priority of the frame. In this case, to determine in which outbound queue the corresponding frame is queued among a plurality of outbound queues, the relationship information (or mapping information) between the priority and traffic class described with reference to FIG. 4 may be used. Also, the status of each outbound queue may be monitored and managed by a queue management module.

After frames are stored in the outbound queue, the frames may be transmitted in a serial manner through the transmission selection step. While data are transmitted serially, bandwidth may be secured, and the overall network performance may be guaranteed or optimized by delaying the frames according to their traffic class, which may be referred to as traffic shaping. A device that performs the traffic shaping may be called a traffic shaper or shaper for short. The traffic shaping may be used together with the stream reservation described above, which, in this case, enables desired QoS to be obtained. The transmission selection step will be described in detail below.

In the bridge forwarding process above, all of the steps above may be performed, but only part of the steps may be performed depending on the embodiments. Also, the bridge forwarding process above may be performed by one or more processors within the bridge.

In what follows, a queue management method of a network device according to one embodiment of the present invention will be described. In particular, a queue management method of a network device in the occurrence of babbling idiot will be described. As described above, the network device may correspond to a bridge within a bridged network based on the IEEE802.1 or apparatus (or system) which include the bridge or which is included therein. For example, the network device may be an MAC bridge or VLAN bridge following the IEEE802.1D or IEEE802.1Q, or apparatus (or system) including the bridge or included therein. In the present specification, descriptions applied to the bridge may also be applied to the network device in the same or in a similar way.

As an embodiment, a queue management method (or step) performed in a network device may correspond to the queue management step (or method) of the bridge forwarding process of FIG. 10. In the embodiment of FIG. 10, the transmission selection step (or method) is to a method related to the output of a queue stored in an outbound queue as the queue management step (or method) is to a method for managing an input to a queue of the outbound queue. As described above, an outbound queue refers to a queue (or buffer) used for outputting data and data frames (or frames) from the corresponding bridge port. While monitoring the status of a queue through a preconfigured queue management method, the network device may perform the role of efficiently managing the status of the queue by duly removing data frames at an appropriate timing after or before the queue is completely filled up.

In the present specification, the babbling idiot refers to a faulty talker or bridge (or switch). Here, a fault refers to a state where a device (for example, talker or bridge) pours out wrong data in an abnormal manner or transmits data at wrong timing due to a device failure or malfunction. A stream (faulty stream) generated by a faulty talker or bridge may not only exert an influence over other streams but also be propagated over the whole network to exert an influence over the whole network. In other words, a faulty stream may exert an adverse influence over non-faulty streams and network for which bandwidth and latency have to be ensured; and may make the non-faulty streams and network malfunction. Therefore, it is necessary to have a method for detecting and preventing occurrence of such a faulty stream for normal operation of a network. In the present specification, An abnormal stream may also be called a bad stream, a fault stream.

In the present specification, a data frame (or frame) refers to the unit of transmitted data, and a data stream (or stream) refers to a data flow from one end station (for example, talker) to another end station (for example, listener). One stream may include one or more frames.

Figure 11:
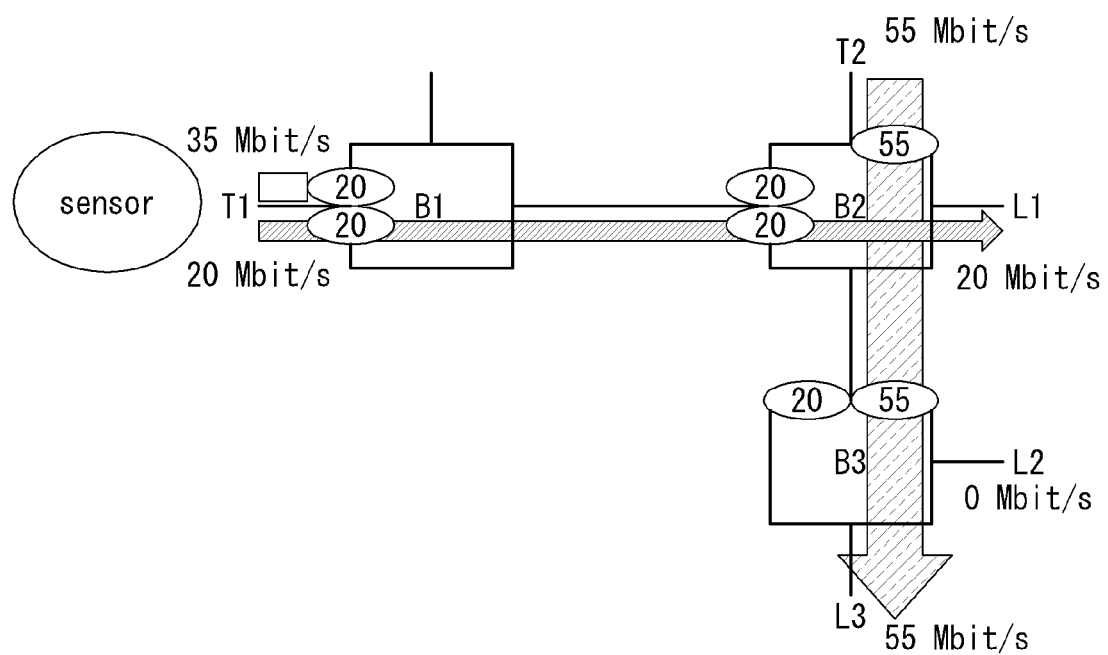
FIG. 11 illustrates a per-stream filtering and policing method according to one embodiment of the present invention.

FIG. 11 illustrates a per-stream filtering and policing (PSFP) method according to one embodiment of the present invention. FIG. 11 illustrates a case where a network device according to one embodiment of the present invention performs the PSFP method. Here, differently from a per-class filtering and policing method where filtering and policing is performed for each traffic class, the PSFP method refers to the filtering and policing method performed for each stream. As an embodiment, the PSFP method may be performed through an ingress policing filter (or stream filter) within a network device. Here, filtering refers to blocking transfer of a data frame from an input port to an output port, and policing refers to dropping the input data frame.

If the PSFP method is employed, a network device may efficiently deal with a faulty stream due to the babbling idiot. For example, if one of a plurality of stream having the same traffic class is a faulty stream, a network device may distinguish the faulty stream from other non-faulty streams and duly block only the faulty stream, thereby ensuring normal transmission of the non-faulty streams. In this way, if filtering and policing is performed for each stream, only the faulty stream among a plurality of streams having the same traffic class and being stored in the same queue may be blocked properly, and thereby queues may be managed more efficiently than when filtering and policing is performed for each traffic.

Generally, the PSFP method of the embodiment of FIG. 11 may be applied to a predefined network. A predefined network refers to the network in which resources (or characteristics) of each stream, for example, stream ID, bandwidth, importance, and priority are known to network devices (or user of the network) beforehand. When a predefined network is used, since a network device already knows characteristics of each stream, the network device may determine whether the corresponding stream is normal or abnormal and may use the PSFP method in the occurrence of a faulty stream.

In the embodiment of FIG. 11, the network is a predefined network, and it is assumed that bandwidth of 20 Mbit/s is allocated respectively to two streams (stream 1 and stream 2) transmitted from talker 1 (T1), and bandwidth of 55 Mbit/s is allocated to the stream (stream 3) transmitted from talker 2 (T2). Therefore, an ingress policing filter for filtering and policing of stream 1 and stream 2 may have a bandwidth limit of 20 Mbit/s respectively while an ingress policing filter for stream 3 may have a bandwidth limit of 55 Mbit/s.

At this time, as shown in the figure, when the talker 1 malfunctions and transmits a stream of 35 Mbit/s bandwidth for the stream 1 for which bandwidth of 20 Mbit/s has been allocated, the network device (for example, bridge) may detect by using a preconfigured detection method (or algorithm) that the stream 1 is a faulty stream. As an embodiment, the detection algorithm may be "Bandwidth Profile Parameters and Algorithm" defined in the Metro Ethernet network architecture Forum (MEF) 10.3.

When stream 1 is detected as a faulty stream, the network device may block the stream 1 from an input port through the ingress policing filter for the stream 1. By doing so, other streams are not influenced by the stream 1, which is now a faulty stream, and may be transmitted in a normal manner within allocated bandwidth. As described above, when the PSFP method is used, the network device may properly block only faulty streams and ensure normal transmission of non-faulty streams.

Figure 12:
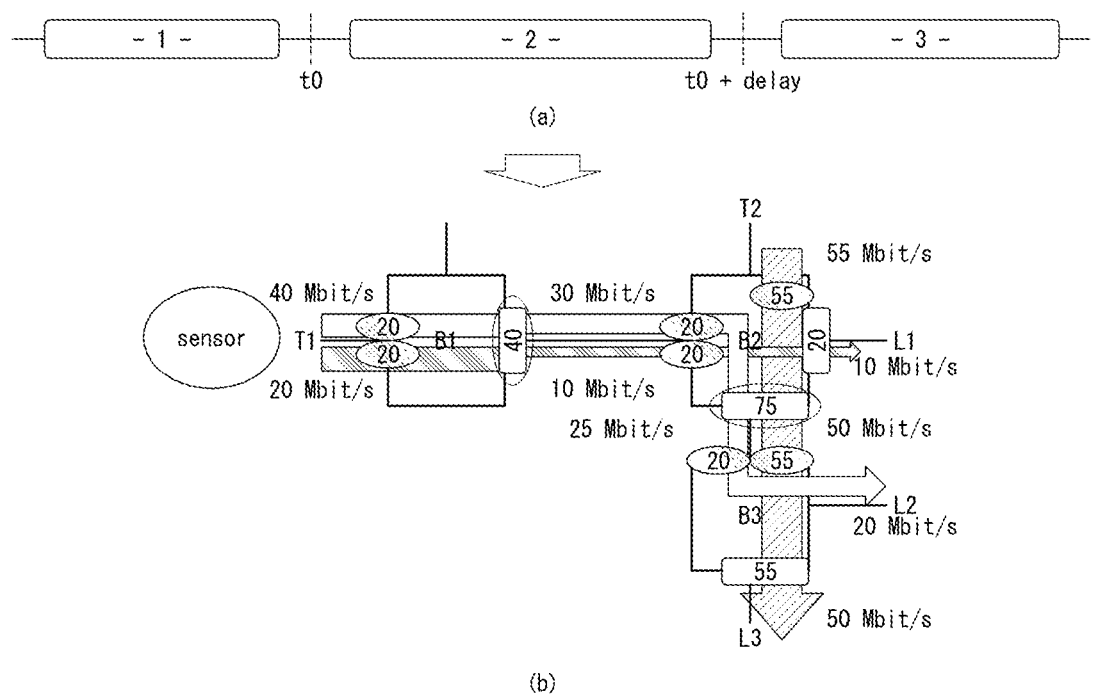
FIG. 12 illustrates policing and filtering latency according to one embodiment of the present invention.

FIG. 12 illustrates policing and filtering latency according to one embodiment of the present invention. More specifically, FIG. 12(a) illustrates a process from the occurrence of a faulty stream to blocking thereof according to the progress of time when the PSFP method of FIG. 11 is used, and FIG. 12(b) illustrates the effect exerted over the network by the faulty stream during the period from the occurrence to blocking of the faulty stream. Descriptions of FIG. 12 already given with reference to FIG. 11 will be omitted.

In FIG. 12(a), the period denoted by '1' (first period) represents a period in which a faulty stream has not been occurred yet, namely a period in which the network operates in a normal manner. t0 represents the time at which a faulty stream is occurred at a particular node (for example, a particular talker or particular bridge). The period denoted by '2' (second period) represents a period ranging from the occurrence of a faulty stream to the time when the faulty stream is detected and blocked. It is assumed that during this period, a faulty stream has been occurred, but the policing and filtering function has not been applied yet, which may also be called a "delay period". The period denoted by '3' (third period) represents a period in which the policing and filtering function is performed on the faulty stream, and the faulty stream is not propagated further over the network. Operations performed during the third period are the same as described with reference to FIG. 11. In what follows, with reference to FIG. 12(b), how a faulty stream is propagated over the network and affects operations of other streams during the delay period will be described.

Referring to FIG. 12(b), due to malfunction of talker 1 (T1), data from the stream 1 transmitted from T1, for which bandwidth of 20 Mbit/s has been allocated, may be transmitted at the bandwidth of 40 Mbit/s. In other words, babbling idiot is occurred, and the stream 1 may become a faulty stream. In this case, if bandwidth of 40 Mbit/s is allocated for the output of a first network device (for example, bridge 1), the stream 2, which is a non-faulty stream for which bandwidth of 20 Mbit/s has been allocated, is influenced by the stream 1, which is now a faulty stream, output bandwidth of the stream 2 may be reduced to 10 Mbit/s. In a similar way, the stream 1, which is a faulty stream, may affect output bandwidth of a non-faulty stream even at the bridge 2 and 3. For example, the output bandwidth of the stream 3 for which bandwidth of 55 Mbit/s has been allocated in the second network device (for example, bridge 2) may be reduced to 50 Mbit/s. Detailed descriptions of how a faulty stream affects non-faulty streams during a delay period will be given with reference to FIG. 13.

As described above, during a delay period, a faulty stream may affect output bandwidth of non-faulty streams. Meanwhile, if it is the case that a non-faulty stream affected by a faulty stream has high importance or priority and is a critical stream that is not allowed to have a frame loss, a critical result may be caused due to reduction of output bandwidth according to the frame loss occurred during the period. For example, if the corresponding stream is a safety critical stream that relays vehicle safety-related data in an in-vehicle network, a fatal consequence may be caused even from a short-term fault. Therefore, separately from the policing and filtering method performed after the delay period, it is necessary to have a method for minimizing the effect from a faulty stream over a stream with a high importance even for the delay period.

Figure 13:
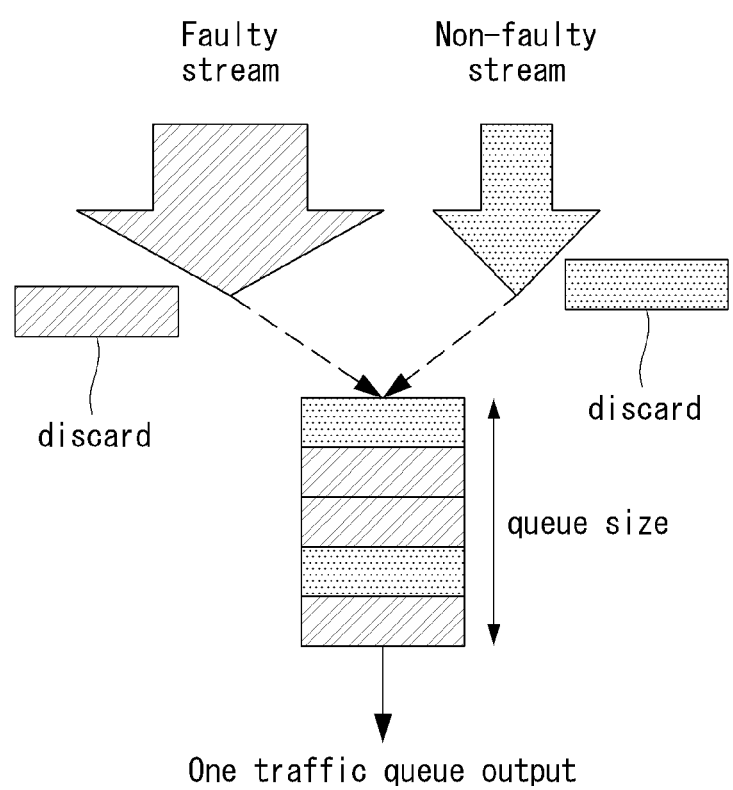
FIG. 13 illustrates status of a queue during a delay period of FIG. 12.

FIG. 13 illustrates status of a queue during a delay period of FIG. 12. In FIG. 13, it is assumed that a faulty stream and a non-faulty stream belong to the same traffic class and are stored in one outbound queue together. In the present specification, a traffic class refers to classification used to expedite transmission of frames (or data frames). Also, an outbound queue refers to the queue (or buffer) used for outputting data and data frames from the corresponding bridge port. In the present specification, a queue may also be referred to as a buffer.

Referring to FIG. 13, when the babbling idiot occurs, an amount of data input to an outbound queue is increased instantaneously due to a faulty stream, and the queue size may be exceeded. In this case, according to a preconfigured queue management method (or algorithm), subsequent input frames may be discarded. As an embodiment, the queue management algorithm may correspond to Random Early Detection (RED) algorithm or Weight Random Early Detection (WRED) algorithm. RED and WRED algorithms may follow the IEFT RFC 2309 standard. Also, the queue management algorithm may correspond to the queue management algorithm based on stream priority to be described later.

RED algorithm continuously monitors the available size of a queue and discards frames based on a statistical probability value. When a network device uses the RED algorithm, as frames are piled up in a queue, the amount of frames discarded from the input frames are increased accordingly. Also, when a network device uses the RED algorithm, the network device may discard all of the incoming frames after the queue is full with frames, thereby preventing global synchronization. Here, global synchronization refers to the phenomenon that a plurality of nodes lower their transmission rate simultaneously in response to congestion. Since prevention of global synchronization may prevent the whole network from being slowed down, use of the RED algorithm may be regarded as a method for improving network efficiency.

WRED algorithm also monitors the status of a queue like the RED algorithm and when frames input to the queue are discarded, differentiate the frames from each other so that frames with less importance are discarded more. At this time, a drop_eligible bit (or parameter) may be used, and those frames with the drop_eligible parameter set may be discarded before other frames. As an embodiment, the drop_eligible parameter may be encoded into and decoded from the PCP field of a VLAN tag of a frame as shown in the embodiment of FIG. 2. For example, the DEI field may be the 1-bit field allocated to the PCP field.

The RED and WRED algorithms do not correspond to such kind of algorithm that discards frames from a queue by differentiating streams from each other. Therefore, when RED or WRED algorithm is used as a queue management algorithm, frames input after the occurrence of the babbling idiot may be discarded irrespective of the type of a stream to which the frames belong. In other words, irrespective of whether an incoming frame is one of a faulty stream or non-faulty stream, the frame may be discarded from the outbound queue.

In this way, if RED or WRED algorithm is used, a network device may remove not only the frames of a faulty stream but also the frames of a non-faulty stream from the outbound queue during the delay period. At this time, when the removed non-faulty stream corresponds to a safety-critical stream used in a car, for example, a fatal consequence may be caused due to a short-term frame loss as described above. Therefore, it is necessary to have a new type of queue management method (or algorithm) for determining priority of a stream discarded during the delay period based on the importance or priority of the stream.

In what follows, a queue management algorithm (or method) according to one embodiment of the present invention will be described. A queue management algorithm according to one embodiment of the present invention is based on priority (or importance) of a stream, which may be called a stream priority-based queue management algorithm (or method), priority-based queue management algorithm (or method), or priority-based algorithm (or method). As an embodiment, the priority-based algorithm may be used together with the PSPF method mainly described above.

If the priority-based algorithm is used as a queue management algorithm, and a predefined frame removal condition is satisfied (for example, if a queue is completely full with data frames), a network device may identify a stream to which data frames stored in the queue belong and remove data frames of at least one stream among those streams identified based on pre-configured stream priority information (table).

At this time, among the identified streams, the network device may remove, with top priority, data frames of non-critical streams not belonging to the stream priority table from the queue. If the frame removal condition is met again while data frames of non-critical streams are completely removed from the queue, the network device may remove, from the queue, data frames of a stream with the lowest priority among critical streams included in the stream priority table.

Here, a critical stream is a stream for which frame loss has to be minimized and may be included in the stream priority table (or information) to minimize the frame loss. For example, a critical stream may receive a critical influence even from a short time period or from a small amount of frame loss, which, for example, may be a safety critical stream that carries safety-related data inside a vehicle.

Here, a non-critical stream refers to a stream that is not a critical stream. For example, a non-critical stream may be a stream (for example, a stream that carries non-safety related data) which is not affected critically from a short time period or a small amount of frame loss. As an embodiment, a non-critical stream may not be included in the stream priority table.

As described above, if the frame removal condition for a queue is satisfied, and data frames have to be discarded from the queue, a network device employing the priority-based algorithm discards the data frames within a non-critical stream rather than a critical stream first and then discards data streams of the corresponding stream in the ascending order of priority or importance among critical streams. If queues are managed as described above, a critical stream with the highest priority may be discarded last from the queue.

In doing so, a network device may minimize frame loss for a critical stream with high priority. If frames of a non-faulty stream are discarded from a queue during the aforementioned delay period as the non-faulty stream is affected by a faulty stream, frame loss for a critical stream with high priority among non-faulty streams may be minimized. By doing so, a critical error caused by a faulty stream during the delay period may be prevented.

The priority-based algorithm may be used together with other queue management algorithm, RED or WRED algorithm. For example, when the priority-based algorithm is used together with the RED algorithm, the network device may reference the priority table before a queue turns into the full state, namely before the queue is filled up with data frames. By doing so, the network device may perform queue management by taking into account the priority of a stream at an early stage (or much earlier).

As another example, if the priority-base algorithm is used together with WRED algorithm, the network device may reference the priority table and the DEI field within a frame before a queue becomes the full state. In this case, for example, when streams rather than the safety critical stream are discarded first, the network device may discard the streams by setting different levels for the respective data frames (or streams) based on the DEI field value; next, when safety critical streams are discarded, the network device may discard data frames by setting different levels for the respective streams based on the priority table. By doing so, the network device may perform queue management at an early stage by taking into account the priority of a stream or data frame.

As described above, when the priority-based algorithm is used as a queue management algorithm, priority of a stream may be considered when frames are to be discarded from a queue. In this case, the stream priority table (or information) may be referenced. An example of the stream priority table will be described in detail with reference to FIG. 14.

Figure 14:
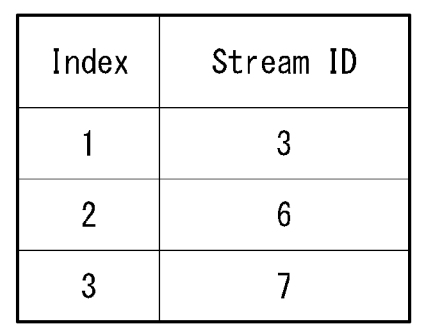

FIG. 14 illustrates a stream priority table according to one embodiment of the present invention. More specifically, FIG. 14 illustrates one example of a stream priority table (or information) referenced when a network device discards data frames from a queue as a frame removal condition is satisfied while the priority-based algorithm is used as a queue management algorithm. As an embodiment, the stream priority table may be referenced (or searched) by the network device only when the frame removal condition is satisfied. In other words, the network device may reference the stream priority table only when the frame removal condition is satisfied. In the present specification, the stream priority table may be referred to as a priority table.

Referring to Table 14, the stream priority table (or information) may include stream identification (ID) information about predefined critical streams and priority information (or index) associated with each stream identification information. As an embodiment, the stream priority table may be configured for each port within a network or for each queue within a port. As an embodiment, the stream priority table may be created, updated, or managed by a management entity that manages information related to the operation or security of a network device. For example, the management entity may be an internal management entity within the network device or a remote management entity (or external management entity) which manages the network device remotely from the outside by being connected to the network device directly or indirectly within the network.

If the network is a predefined network and/or streams of the network are reserved, a network user may predetermine which stream among various streams of the network corresponds to a critical or non-critical stream and predetermine priorities among critical streams. Therefore, based on the predetermined classification or priority of the streams, the network user may preconfigure a stream priority table such as one shown in FIG. 14, store the preconfigured stream priority table in a database such as a management information database, and manage the stored stream priority table therein.

In the stream priority table, the index provides priority information (or importance) of a stream having the corresponding stream ID. As an embodiment, when the index value is small, stream priority (or importance) may be high while, when the index value is high, stream priority (or importance) may be low; or vice versa depending on the embodiment. For example, as shown in FIG. 14, the priority of a stream corresponding to stream ID (3) with an index value of 1 may be higher than the priority of a stream corresponding to stream ID (6) with an index value of 2.

As an embodiment, the stream priority table may include only priority information about critical streams. By doing so, instead of determining and managing priorities of the entire streams within a network, it suffices to determine and manage only the priorities of critical streams required, and therefore, creation and management of the priority table may be made easy. Also, in this case, the network device may know from the stream priority table how many critical streams exist within a predefined network. In the embodiment of FIG. 14, it may be seen that three critical streams exist within a predefined network. Therefore, in the present specification, the stream priority table may be called a safety critical stream ID table or safety critical stream table.

FIGS. 15a to 15d illustrate status change of a queue according to time when a queue management method according to one embodiment of the present invention is used. In the embodiment of FIGS. 15a to 15d, the aforementioned priority based algorithm may be used as a queue management method.

Also, in the embodiment of FIGS. 15a to 15d, it is assumed that data frames from a plurality of streams are stored in the same queue. For example, it is assumed that a first data frame of a first stream, a second data frame of a second stream, and a third data frame of a third stream are stored in a first queue which is one of at least one outbound queue of an output port. At this time, as shown in the figure, the first stream may be a non-critical stream having a stream ID of 1, the second stream is a critical stream having a stream ID of 3, and the third stream is a critical stream having a stream ID of 3. Also, in the embodiments of FIGS. 15a to 15d, it is assumed that a faulty stream is occurred at time t0, and a faulty stream is blocked (or filtered) at time t0+delay. For example, it is assumed that the third stream is a faulty stream at t0, and the third stream, which is a faulty stream, is blocked at time t0+delay.

Figure 15A:
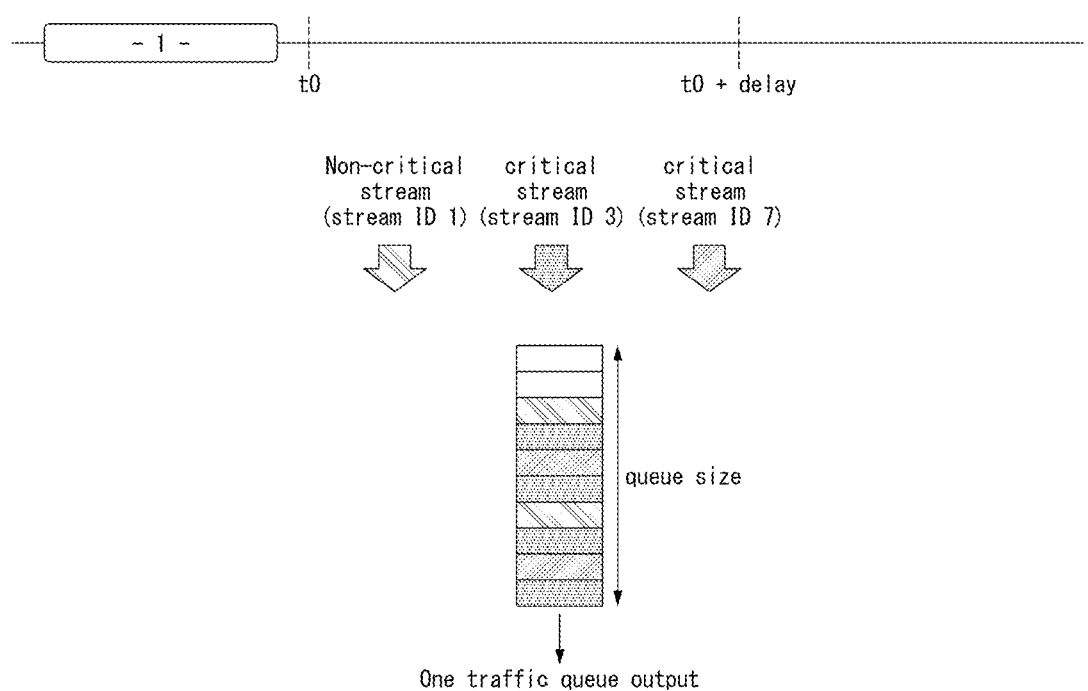
FIGS. 15a to 15d illustrate status change of a queue according to time when a queue management method according to one embodiment of the present invention is used.

FIG. 15a shows an illustrative status of a queue during the first period in which no faulty stream is occurred yet. In the embodiment of FIG. 15a, the first queue is in a normal status where it is not completely filled and stores two first data frames of the first stream, four second data frames of the second stream, and two third data frames of the third stream.

Figure 15B:
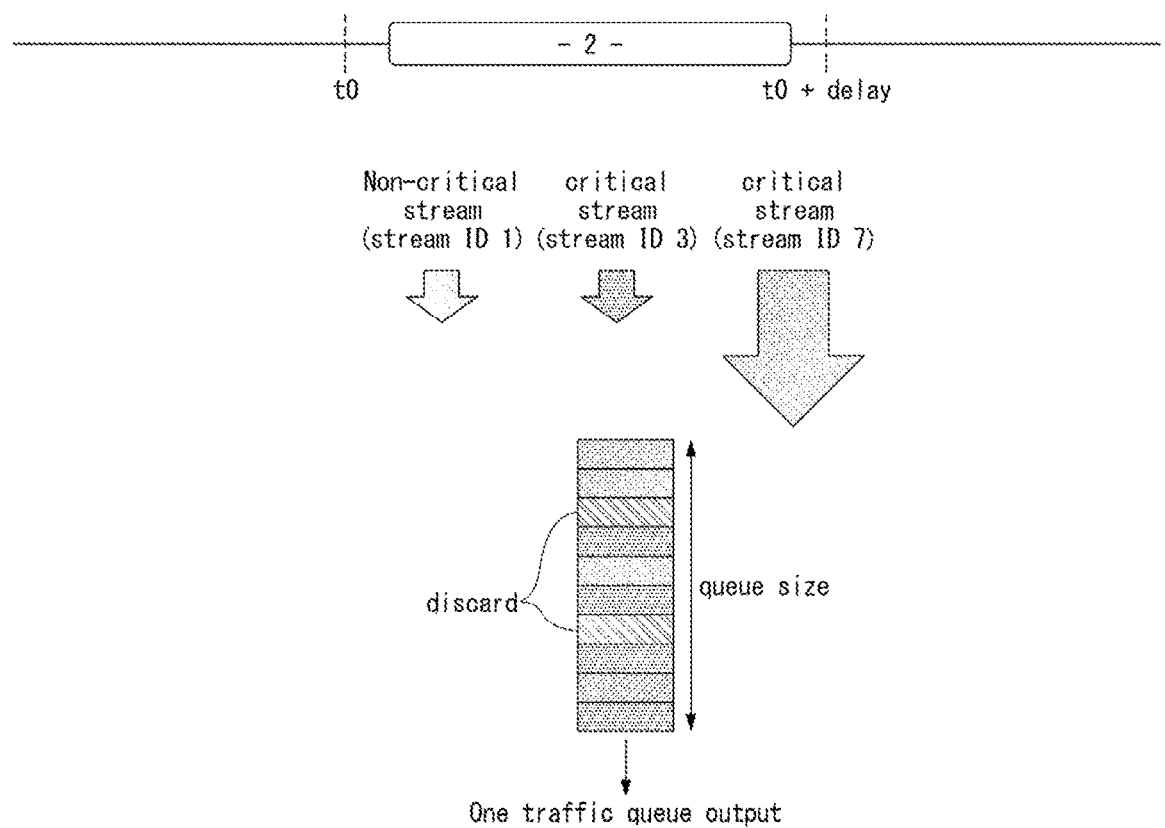

FIG. 15b shows an illustrative status of a queue during a second period, namely delay period ranging from the time at which a faulty stream is occurred to the time at which the faulty stream is detected and blocked (or filtered/policed). Blocking of a faulty stream may use the PSFP method, for example. In the embodiment of FIG. 15b, the first queue becomes completely full by the third stream, which is a faulty stream. In other words, the frame removal condition for the first queue is satisfied. Here, the frame removal condition refers to the condition that has to be satisfied to remove at least one frame from the corresponding queue. In other words, the frame removal condition refers to the condition required to determine whether removal of data frames from a queue is needed or not.

As an embodiment, a network device may monitor the status of a queue and determine whether a preconfigured frame removal condition for the queue is satisfied. For example, if a queue is completely filled up with data frames, namely if the queue is in the full state, the network device may determine that the preconfigured frame removal condition for the queue is satisfied. As another example, if a queue is filled with data frames by more than a preconfigured threshold size, the network device may determine that the preconfigured frame removal condition for the queue is satisfied. For example, if the queue is filled with data frames by more than 80% of the queue size, the network device may determine that the preconfigured frame removal condition for the queue is satisfied.

If the frame removal condition is met, the network device may first identify streams to which frames stored in the first queue belong and based on the priority of each stream, data frames of a stream with the lowest priority may be removed from the first queue before the others. At this time, the network device may reference a stream priority table (or information) as shown in the embodiment of FIG. 14. When the stream priority table of FIG. 14 is referenced, the network device may remove, from the first queue, all of the first data frames of the first stream, which is a non-critical stream having a stream ID not included in the corresponding table.

Through the operation above, even if the frame removal condition for a queue is satisfied, those frames belonging to a critical stream may not be removed from the queue. In other words, a network device may prevent frame loss for the critical stream. Afterwards, the frames stored in the queue may be transmitted (or outputted) by being selected according to a preconfigured queue selection algorithm.

Figure 15C:
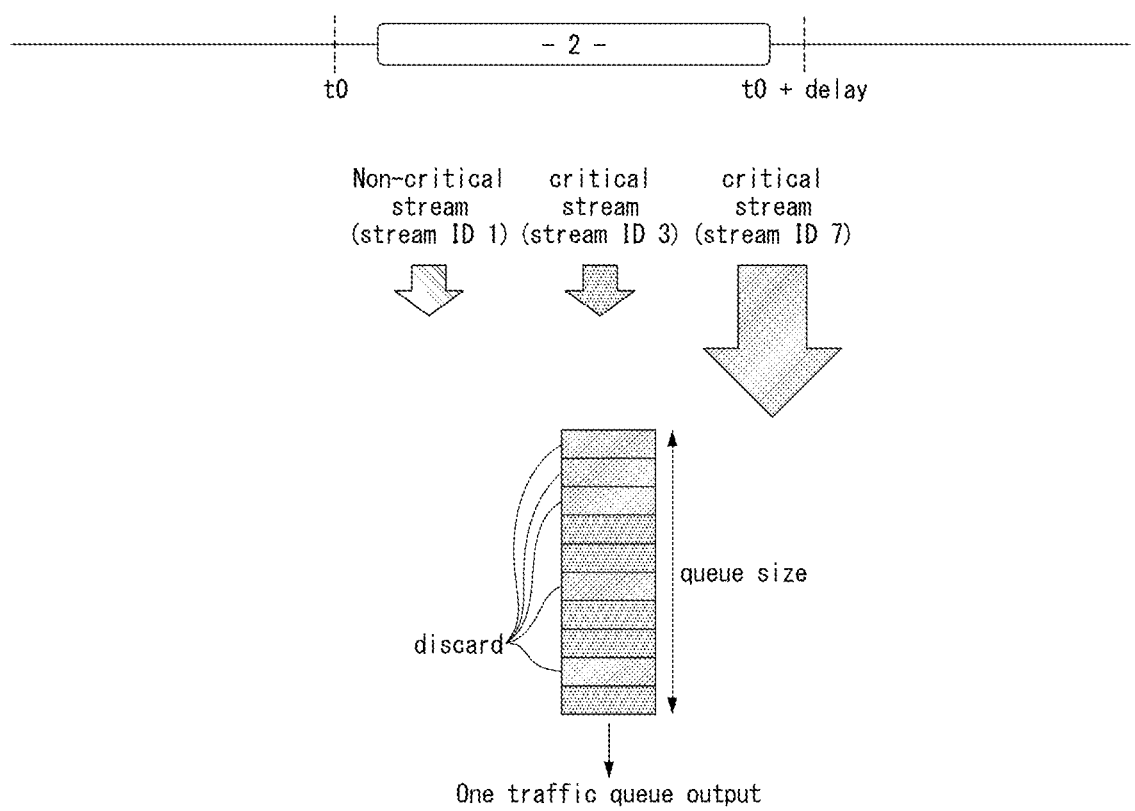

The same as FIG. 15b, FIG. 15c shows an illustrative status of a queue during the second period. For example, the embodiment of FIG. 15c illustrates the status of the first queue for which the frame removal condition is again satisfied by the third stream, which is a faulty stream, after the first data frames of the first stream, which is a non-critical stream, are all removed according to the embodiment of FIG. 15b. In other words, the embodiment of FIG. 15c shows a status that after all of the first data frames of the first stream are removed, the frame removal condition for the first queue is satisfied again.

Therefore, based on the priorities of streams, the network device may remove data frames of a stream with the next lowest priority from the first queue. At this time, when the stream priority table of FIG. 14 is referenced, the network device may remove, from the first queue, all of the third data frames of the third stream with a lower priority among critical streams having their stream ID included in the corresponding table.

Through the operation above, even if the frame removal condition for a queue is satisfied, those frames belonging to a critical stream with high priority among critical streams may not be removed from the queue. In other words, the network device may prevent frame loss for the critical stream with high priority. Afterwards, the frames stored in the queue may be transmitted (or outputted) by being selected according to a preconfigured queue selection algorithm.

Figure 15D:
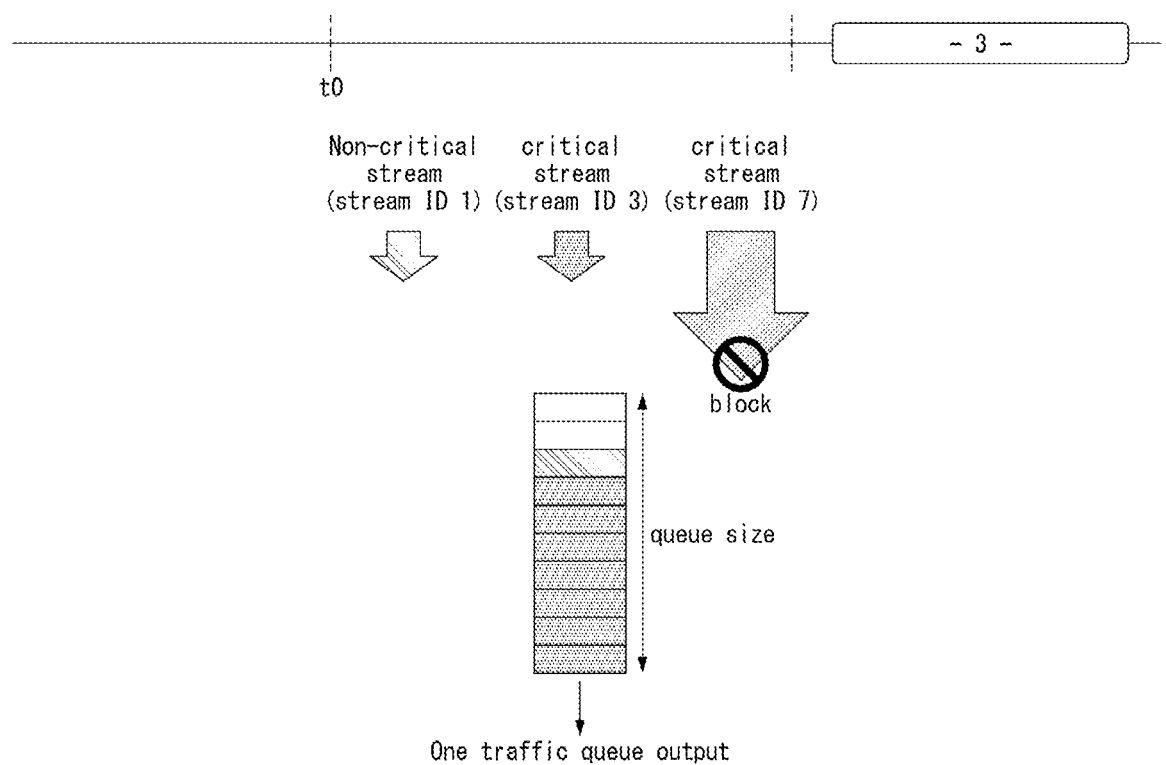

FIG. 15d illustrates status of a queue during a period after a faulty stream (or babbling) is blocked as policing and filtering function is operated for each stream. In FIG. 15a, the first queue is normal and may additionally store the first frame of the non-blocked first stream and/or the second frame of the second stream.

Although FIGS. 15a to 15d have described embodiments of the present invention with respect to a case where non-critical and critical streams are all stored in a queue, the embodiments are merely an example for the convenience of descriptions, and the present invention is not limited to the specific embodiments. For example, when the queue contains only the data frames of critical streams, the network device may check the priorities of the critical streams based on the priority information and remove data frames of the corresponding critical stream from the queue, starting with the lowest priority in the ascending order. Also, although FIGS. 15a to 15d have described embodiments of the present invention with respect to a case where one of streams stored in a queue becomes a faulty stream, the embodiments are merely an example for the convenience of descriptions, and the same descriptions may be applied for a case where none of the streams stored in the queue becomes a faulty stream.

As described above, when the frame removal condition for a queue is satisfied, the network device has to identify the streams to which data frames stored in the queue in order to remove the data frames of a specific stream from the queue based on the priorities of the streams. In what follows, a method for the network device to identify a stream to which data frames belong will be described. Identification of a stream to which data frames belong may be done through stream identifier (ID) information. In the present specification, the stream ID information refers to the information for identifying a stream.

In one embodiment, stream ID information may be created based on destination address information of a data frame belonging to the stream and VLAN ID information. For example, as defined in the IEEE 802.1Q, the stream ID information may be an integer value generated mathematically based on the destination address information and VLAN ID information. Meanwhile, the IEEE 802.1Q defines the stream ID information only when stream reservation is used, and if a network according to one embodiment of the present invention is a predefined network informed of the characteristics of streams used in the network, the stream ID information defined in the IEEE 802.1Q may also be used for the present invention.

In another embodiment, the stream ID information may be defined by various types. For example, as defined in the IEEE 802.1CB (Frame Replication and Elimination for Reliability), the stream ID information may be stream ID information of a first type based on a null stream identification function; stream ID information of a second type based on the source MAC and VLAN stream identification function; stream ID information of a third type based on destination MAC and VLAN stream identification function; and stream ID information of a fourth type based on the IP octuplet stream identification function.

Here, the null stream identification function may correspond to a passive stream identification function, and stream ID information of the first type may be generated based on the destination MAC address information and VLAN ID information.

Also, the source MAC and VLAN stream identification function may correspond to the passive stream identification function, and stream ID information of the second type may be generated based on the source MAC address information and VLAN ID information.

Also, the destination MAC and VLAN stream identification function may correspond to an active stream identification function, and stream ID information of the third type may be generated based on the destination MAC address information and VAL ID information.

Also, the IP octuplet stream identification function my correspond to the passive stream identification function, and stream ID information of the fourth type may be generated based on the destination MAC address information, VLAN ID information, IP source address information, IP destination address information and IP next protocol information, source port information and/or destination port information. In the present specification, the passive stream identification function may be referred to as a passive identification function, and the active stream identification function may be referred to as an active identification function.

Here, the passive stream identification function refers to a function that at the transmitter-side, the function relays the packet (or frame) received from an upper layer to a lower layer without performing any processing related to stream identification to the received packet while at the receiver-side, the function examines the packet (or frame) received from the lower layer, identifies a stream of the packet, and determines through which Service Access Point (SAP) to relay the corresponding packet to the upper layer.

Here, the active stream identification function refers to a function that at the transmitter-side, the function encodes selection of the SAP by adjusting a data parameter of the packet received from an upper layer and encapsulates and relays the packet to a lower layer while at the receiver-side, the function decapsulates the packet received from the lower layer and relays the decapsulated packet to the upper layer through a suitable SAP according to the stream identification information obtained from the packet.

In the case of a destination MAC and VLAN stream identification function, which is an active stream identification function, at stations except for a final end station (for example, listener), the destination MAC address and VLAN ID are modified (or overwritten) by different values inside a layer in which the stream identification function is applied; and these values are restored to their original values at the final end station. When the destination MAC and VLAN stream identification function is used as a stream identification function of the present invention, the stream identification function has to include a function which tracks a modified destination MAC address and VLAN ID used inside a layer and checks which stream ID is used. In this case, a user has to know stream ID information of a critical stream that has a different value for each bridge.

FIGS. 16(a) and 16(b) illustrate location of stream ID information according to one embodiment of the present invention.

As an embodiment, stream ID information may be included in a service primitive (or primitive) of an Internal Sublayer Service (ISS). As described with reference to FIG. 5(b), ISS is a service provided in an internal layer and provides a basic function of the MAC service, which performs data transmission among a plurality of Service Access Points (SAPs) and allows relaying of data frames between bridge ports.

ISS may two service primitives as shown in FIGS. 16(a) and (b), namely MAC unit data request (M_UNITDATA.request) primitive and MAC unit data indication (M_UNITDATA.indication) primitive. Here, the MAC unit data request primitive is a primitive by which the MAC layer requests data from the physical layer, and the MAC unit data indication primitive is a primitive by which the MAC layer indicates data for the LLS sublayer. As shown in the figure, the MAC unit data request primitive or MAC unit data indication primitive may include a plurality of parameters, which have been already described with reference to FIG. 5(b).

In one embodiment, stream ID information may be included in the connection identifier (connection_identifier) information (or parameter) within the MAC unit data request primitive or MAC unit data indication primitive. For example, as shown in FIG. 16(a), stream ID information may be included in the stream handle (stream_handle) information (or parameter), which is sub-information (or parameter) included in the connection identifier information (or parameter) of the MAC unit data request primitive. Also, as shown in FIG. 16(b), stream ID information may be included in the stream handle (stream_handle) information (or parameter), which is sub-information (or parameter) included in the connection identifier information (or parameter) of the MAC unit data indication primitive. The stream handle information may express an identifier (ID) which identifies a stream to which frames (or packets) belong in terms of an integer value.

Figure 17:
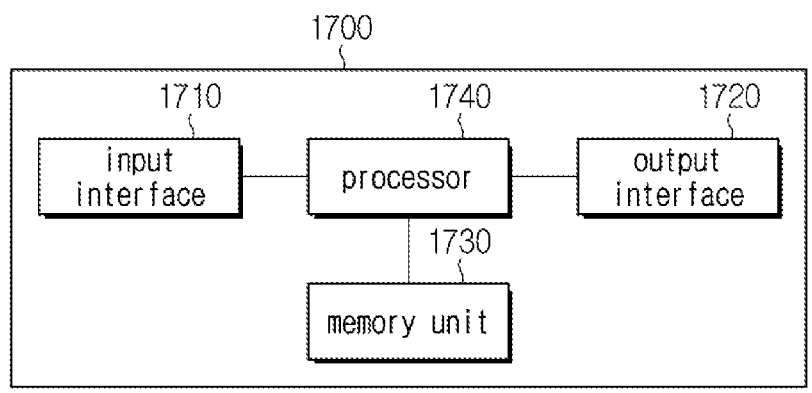
FIG. 17 illustrates a structure of a network device according to one embodiment of the present invention.

FIG. 17 illustrates a structure of a network device according to one embodiment of the present invention.

In the embodiment of FIG. 17, a network device 1700 may comprise an input interface 1710, output interface 1720, one or more memory unit 1730, and processor 1740. As described above, the network device 1700 may correspond to a bridge within a bridged network of the IEEE802.1 or a device including the bridge or included therein. For example, the network device 1700 may correspond to the MAC bridge or VLAN bridge implemented according to the IEEE802.1D or IEEE802.1Q or a network system including the bridge.

As an embodiment, the network device 1700 may include a first memory including one or more queues storing frames input through the input interface 1710 (for example, input port). Also, the network device 1700 may further include a second memory storing at least one of a module, data, computer program command or software for implementing the operation of the network device 1700 according to various embodiments of the present invention. As an embodiment, the second memory may be installed within a memory unit which is the same as or different from the first memory. Also, the network device 1700 may further include a third memory storing the stream priority table of FIG. 14. As an embodiment, the third memory may be installed within a memory unit which is the same as or different from the first memory and/or second memory. For example, the first, second, and third memory may all be installed within the same memory unit or may be installed within different memory units respectively. Also, two memories may be installed in the same memory unit but the remaining one memory may be installed in a memory unit different from the aforementioned memory unit.

The processor 1740 may be connected to the memory unit 1730 and configured to perform operation due to various embodiments of the present invention according to the figure and descriptions above. For example, the processor 1740 may be configured to perform a stream priority-based queue management method and set different levels for the respective streams to discard data frames from a queue when a frame removal condition is satisfied or configured to implement the data link layer and physical layer of the IEEE802 network. In the present specification, the processor 1730 may be a concept including a controller controlling the operation of each unit of the network device 1700 of the present invention.

A specific structure of the network device 1700 of FIG. 17 may be implemented so that various embodiments of the present invention may be applied independently or two or more embodiments may be applied together. Not only the descriptions related to FIGS. 18 and 19 but also the descriptions of the specification given above may be applied to the priority-based queue management method of the network device 1700 shown in FIG. 17.

Figure 18:
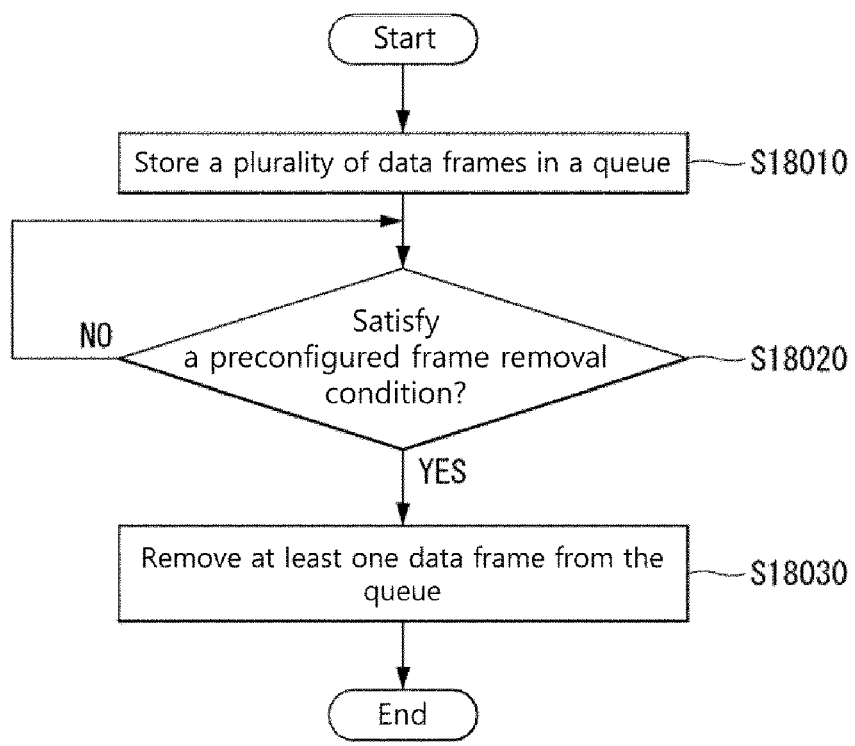
FIG. 18 illustrates a queue management method of a network device according to one embodiment of the present invention.

FIG. 18 illustrates a queue management method of a network device according to one embodiment of the present invention.

Referring to FIG. 18, a network device may store a plurality of data frames in a queue S18010. As an embodiment, the network device may store a plurality of data frames in a queue based on traffic classes associated with the data frames. In this case, a plurality of data frames stored in the same queue may have the same data class.

The network device may determine whether a preconfigured frame removal condition for a queue is satisfied S18020. As an embodiment, the network device may monitor the status of a queue and determine whether a preconfigured frame removal condition for the queue is satisfied. Here, the frame removal condition refers to a condition required to determine whether removal of data frames from a queue is needed. For example, if a queue is completely filled up with data frames, namely if the queue is in the full state, the network device may determine that the preconfigured frame removal condition for the queue is satisfied. As another example, if a queue is filled with data frames by more than a preconfigured threshold size, the network device may determine that the preconfigured frame removal condition for the queue is satisfied. For example, if the queue is filled with data frames by more than 80% of the queue size, the network device may determine that the preconfigured frame removal condition for the queue is satisfied.

If the preconfigured frame removal condition is not satisfied, the network device may continue to monitor the status of a queue and determine whether the preconfigured frame removal condition is satisfied.

If the preconfigured frame removal condition is satisfied, the network device may remove at least one data frame from the queue S18030, which will be described in detail with reference to FIG. 19.

Figure 19:
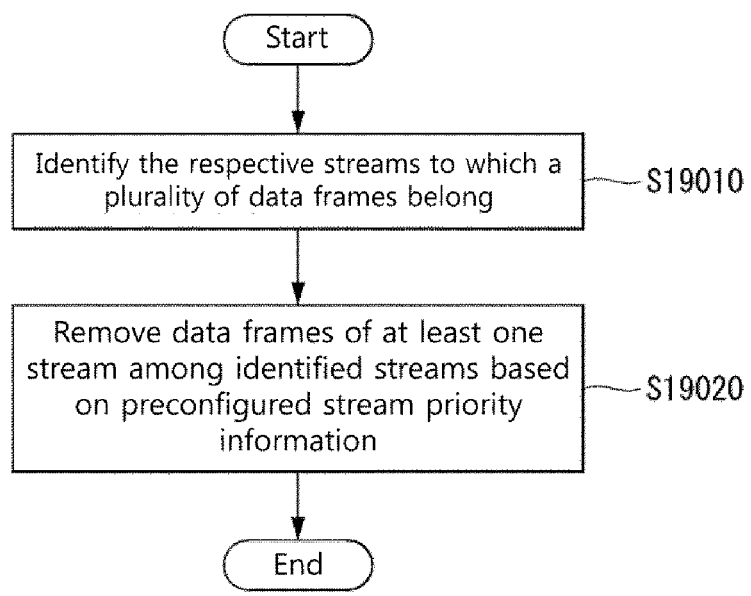
FIG. 19 illustrates a queue management method of a network device according to another embodiment of the present invention.

FIG. 19 illustrates a queue management method of a network device according to another embodiment of the present invention. More specifically, FIG. 19 illustrates a method for removing at least one data frame from a queue by the network device since a preconfigured frame removal condition is satisfied when the priority-based method (or algorithm) is used as a queue management method. As an embodiment, the priority-based algorithm may be used only for a case where the PSPF method is applied. Detailed descriptions about those parts of FIG. 19 already given with reference to FIGS. 1 to 18 will be omitted.

If a preconfigured frame removal condition is satisfied, the network device may identify the respective streams to which a plurality of data frames belong S19010. In this case, the network device may identify the respective streams to which data frames belong by obtaining stream identification (ID) information about each of the data frames. This operation is the same as already described with reference to FIG. 16.

In one embodiment, the network device may identify a stream to which a data frame belongs by using additional information in addition to the information obtained from the data frame. As an embodiment, the additional information may be the information used only internally within the network device. For example, the network device may obtain a stream ID of the stream to which a data frame belongs from the connection identifier (connection_identifier) information (or parameter) within the unit data primitive of the ISS. At this time, stream handle information, which is sub-information of the connection identifier information, may be used to obtain the stream ID of the stream to which the data frame belongs.

In another embodiment, the network device may identify a stream to which a data frame belongs by using the information obtained from the data frame. For example, the network device may identify a stream to which a data frame belongs by obtaining the stream ID of the stream to which the data frame belongs based on the destination MAC address information, source MAC address and/or VLAN ID information of the data frame.

The identified stream may include a critical stream and/or non-critical stream. As an embodiment, the network device may remove data frames of at least one stream among identified streams based on the preconfigured stream priority information.

The network device may remove data frames of at least one stream among identified streams based on the preconfigured stream priority information (or table) S19020. As an embodiment, the stream priority information may include stream identification information about predefined critical streams and priority information associated with each stream identification information. In this case, the network device may determine whether a stream to which the corresponding data frames belongs is a non-critical stream or critical stream based on the obtained stream identification information about the data frame and stream identification information included in the stream priority information.

In one embodiment, the network device may remove, with top priority, the data frames of a non-critical stream not included in the stream priority information among the identified streams.

At this time, if the number of data frames of the non-critical stream is plural, the network device may remove all of the data frames from the queue.

Through this operation, even if a frame removal condition for a queue is satisfied, those frames belonging to a critical stream may be protected without being removed from the queue. In other words, a critical stream may be prevented from frame loss.

In one embodiment, if the preconfigured frame removal condition is satisfied again after data frames of a non-critical stream are completed removed, and at least one data frame has to be removed based on the preconfigured stream priority information, the network device may remove those data frames of a critical stream with the lowest priority among critical streams included in the stream priority information among identified streams. At this time, if the number of data frames of a critical stream is plural, the network device may remove the whole or part of the data frames from the queue.

Through this operation, even if a frame removal condition for a queue is satisfied, those frames belonging to a critical stream with high priority among critical streams may be protected without being removed from the queue. In other words, a critical frame with high priority may be prevented from frame loss.

As described above, when data frames are removed from a queue, a network device may remove the data frames by setting different levels for streams based on their priority (or importance), and thereby frame loss of a critical stream, which leads to a critical consequence, may be minimized even during the delay period.

The embodiments described above are combinations of constituting elements and features of the present invention in a predetermined form. Each individual element or feature has to be considered as optional except where otherwise explicitly indicated. Each individual element or feature may be implemented solely without being combined with other elements or features. Also, it is also possible to construct the embodiments of the present invention by combining part of the elements and/or features. Part of a structure or feature of an embodiment may be included in another embodiment or may be replaced with the corresponding structure of feature of another embodiment. It should be clearly understood that the claims that are not explicitly cited within the technical scope of the present invention may be combined to form an embodiment or may be included in a new claim by an amendment after application.

The embodiments of the present invention may be implemented by various means such as hardware, firmware, software, or a combination thereof. In the case of hardware implementation, one embodiment of the present invention may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present invention may be implemented in the form of modules, procedures, functions, and the like, which perform the functions or operations described above. Software codes may be stored in the memory and activated by the processor. The memory may be located inside or outside of the processor and may exchange data with the processor by using various well-known means.

It is apparent for those skilled in the art that the present invention may be embodied in other specific forms without departing from the essential characteristics of the present invention. Therefore, the detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

MODE FOR INVENTION

Various embodiments have been described in their best mode for implementing the present invention.

INDUSTRIAL APPLICABILITY

The present invention is used in a range of network applications.

It should be clearly understood by those skilled in the art that the present invention may be changed or modified in various ways without departing from the technical principles and scope of the present invention. Therefore, it is intended that the present invention include changes and modifications of the present invention defined by appended claims and provided within their equivalent scope.

The invention claimed is:

1. A network device, comprising:
a queue storing a plurality of data frames, wherein the plurality of data frames have the same traffic class; and
a processor connected to the queue, wherein the processor is configured to:
determine whether the queue satisfies a preconfigured frame removal condition, and
remove at least one data frame from the queue if the preconfigured frame removal condition is satisfied,
wherein the processor is configured to identify streams to which the plurality of data frames respectively belong if at least one data frame is to be removed from the queue and to remove data frames of at least one stream among the identified streams based on preconfigured stream priority information,
wherein the stream priority information includes stream identification information about a predefined critical stream and priority information associated with each stream identification information, wherein the critical stream is a stream included in the stream priority information for minimizing frame loss,
wherein the processor is configured to remove with top priority data streams of a non-critical stream rather than the critical stream among the identified streams if the at least one data frame is to be removed based on the preconfigured stream priority information, and
wherein the processor is configured to remove a first data frame of a first critical stream having the lowest priority within the critical streams among the identified streams if the at least one data frame is to be removed based on the preconfigured stream priority information after the data frame of the non-critical stream is removed.

2. The device of claim 1, wherein the processor is configured to identify a stream to which a data frame belongs by using information obtained from the data frame or additional information in addition to the information obtained from the data frame.

3. A queue management method of a network device, the method comprising:
storing a plurality of data frames to a queue, wherein the plurality of data frames have the same traffic class;
determining whether the queue satisfies a preconfigured frame removal condition, and
removing at least one data frame from the queue if the preconfigured frame removal condition is satisfied by identifying streams to which the plurality of data frames belong respectively and removing data frames of at least one stream among the identified streams based on preconfigured stream priority information,
wherein the stream priority information includes stream identification information about a predefined critical stream and priority information associated with each stream identification information, wherein the critical stream is a stream included in the stream priority information for minimizing frame loss,
wherein the removing the at least one data frame based on the preconfigured stream priority information removes with top priority data streams of a non-critical stream rather than the critical stream among the identified streams, and
wherein the removing at least one data frame comprises,
removing a first data frame of a first critical stream having the lowest priority within the critical streams among the identified streams if the at least one data frame is to be removed based on the preconfigured stream priority information after the data frame of the non-critical stream is removed.

4. The method of claim 3, wherein the identifying a stream to which each of the plurality of data frames belongs identifies a stream to which the data frame belongs by using information obtained from the data frame or additional information in addition to the information obtained from the data frame.

\* \* \* \* \*